(12) United States Patent
Ohtomo et al.

(10) Patent No.: US 6,675,489 B2
(45) Date of Patent: *Jan. 13, 2004

(54) LASER SIGHTING DEVICE

(75) Inventors: Fumio Ohtomo, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/097,917

(22) Filed: Mar. 13, 2002

(65) Prior Publication Data

US 2002/0138997 A1 Oct. 3, 2002

(30) Foreign Application Priority Data

Mar. 20, 2001 (JP) ........................................ 2001-094002

(51) Int. Cl.⁷ ................................................. G01C 5/00
(52) U.S. Cl. .......................... 33/290; 33/291; 356/249; 250/559.3; 250/559.4
(58) Field of Search ......................... 33/290, 227, 228, 33/281, 282, 283, 286, 291, 333, DIG. 21; 356/249; 250/559.3, 559.39, 225, 559.4, 559.11

(56) References Cited

U.S. PATENT DOCUMENTS

| | | | | |
|---|---|---|---|---|
| 3,905,707 A | * | 9/1975 | Feist et al. .................. | 356/249 |
| 4,710,635 A | * | 12/1987 | Chupp ...................... | 250/461.2 |
| 5,636,018 A | * | 6/1997 | Hirano et al. ................ | 356/248 |
| 5,742,387 A | * | 4/1998 | Ammann .................... | 356/247 |
| 5,838,431 A | * | 11/1998 | Hara et al. ................... | 356/138 |
| 5,847,824 A | * | 12/1998 | Ohtomo et al. ............. | 356/249 |
| 5,925,874 A | * | 7/1999 | Liegel et al. ............. | 250/201.3 |
| 5,978,076 A | * | 11/1999 | Kitajima .................... | 356/138 |
| 6,035,540 A | * | 3/2000 | Wu et al. ...................... | 33/286 |
| 6,137,568 A | | 10/2000 | Ohtomo et al. ............. | 356/149 |
| 6,204,498 B1 | * | 3/2001 | Kumagai et al. ........ | 250/222.1 |
| 6,399,940 B1 | * | 6/2002 | Cui et al. .............. | 250/231.13 |
| 6,493,067 B1 | * | 12/2002 | Kodaira et al. ............ | 356/4.08 |
| 2002/0139940 A1 | * | 10/2002 | Ohtomo et al. .......... | 250/559.3 |

FOREIGN PATENT DOCUMENTS

JP        06097042 A  *  4/1994   ......... H01L/21/027

* cited by examiner

Primary Examiner—Diego Gutierrez
Assistant Examiner—Amy R. Cohen
(74) Attorney, Agent, or Firm—Nields & Lemack

(57) ABSTRACT

The present invention provides a laser sighting device, which comprises a tilt detecting device having a liquid member for forming a free liquid surface and a fixed reflection member fixedly mounted, the tilt detecting device being used for detecting angular deviation between the free liquid surface and the fixed reflection member, a main unit for accommodating the tilt detecting device, and a laser beam irradiation unit removably mounted on the main unit.

12 Claims, 13 Drawing Sheets

→ S-POLARIZED LIGHT
↕ P-POLARIZED LIGHT

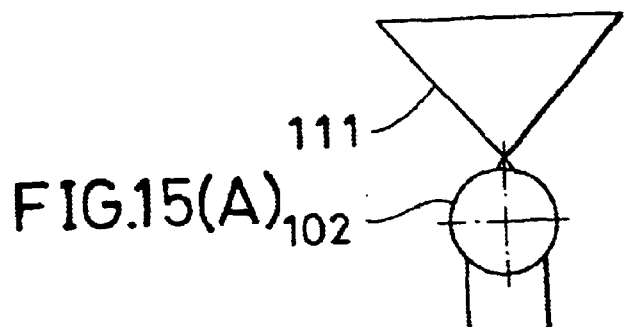
FIG.15(A)
FIG.15(B)
FIG.15(C)
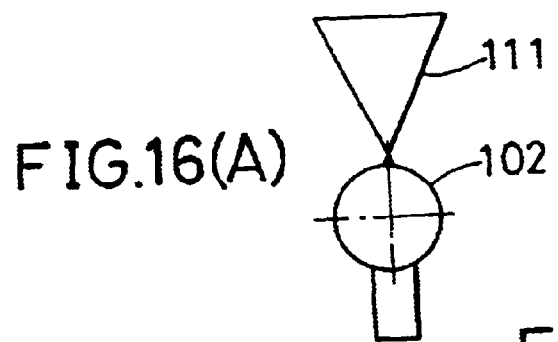
FIG.16(A)
FIG.16(B)
FIG.16(C)

LIGHT BEAM FOR REMOTE CONTROL OPERATION

LASER SIGHTING DEVICE

BACKGROUND OF THE INVENTION

The present invention relates to a laser sighting device for projecting a laser beam in a horizontal or in a vertical direction and forming a laser irradiation reference plane or for projecting a light beam to form a reference point.

As a conventional type laser sighting device, a device is known, which irradiates a laser beam compensated for vertical irradiation via a rotating pentagonal prism and forms a horizontal laser irradiation reference plane. Also, a device is known, which is tilted at an angle of 90° and irradiates a laser beam similarly via a rotating pentagonal prism and forms a vertical laser irradiation reference plane.

Also, a laser sighting device is known, which irradiates a laser beam in one direction or in a plurality of directions and forms one reference point or a plurality of reference points.

The laser sighting device for forming the laser irradiation reference plane or the laser sighting device for forming the reference point as described above may be designed as an independent laser sighting device respectively, while these may be integrated together from economical reason. That is, a part of the optical system is designed as replaceable or the entire optical system may be designed as replaceable as a unit so that the optical systems can be used respectively depending on each purpose of use, and formation of the laser irradiation reference plane and formation of the reference point can be achieved by the use of a single laser sighting device.

In the laser sighting device, for the purpose of forming a reference plane or a reference point accurately, the irradiating direction of the laser beam must be accurately compensated in a vertical or horizontal direction.

In the laser sighting device, which can form the laser irradiation reference plane and the reference point, a tilt sensor comprising a bubble tube is provided to perform leveling operation of the laser sighting device itself so that the laser beam can be irradiated in the vertical or horizontal direction.

However, in the conventional type laser sighting device, in which the optical system can be replaced, the rotary prism can be removed or inserted, or the entire optical system can be replaced depending on the intended purpose. However, there has been provided no means for performing positioning of the optical system and laser sighting device main unit, i.e., there has been provided no means for detecting the relationship between an optical axis of the optical system and the reference angle of the tilt sensor. For this reason, the optical axis of the optical system is deviated with respect to the reference angle of the tilt sensor and the laser irradiation plane or the laser irradiation line is often extremely deviated from the vertical direction or the horizontal direction.

SUMMARY OF THE INVENTION

It is an object of the present invention to provide a laser sighting device, which comprises means for detecting positional relationship between the optical system and the laser sighting device, and by which it is possible to maintain high accuracy in vertical and horizontal directions even when an emitting mode of the laser beam is changed depending on the intended purpose.

To attain the above object, the laser sighting device according to the present invention comprises a tilt detecting device having a liquid member for forming a free liquid surface and a fixed reflection member fixedly mounted, the tilt detecting device being used for detecting angular deviation between the free liquid surface and the fixed reflection member, a main unit for accommodating the tilt detecting device, and a laser beam irradiation unit removably mounted on the main unit. Also, the present invention provides the laser sighting device as described above, wherein there is provided a display unit for displaying a tilt angle and or displaying of an alarm based on a result of tilt detection by the tilt detection device. Further, the present invention provides the laser sighting device as described above, wherein there is provided a leveling unit for performing leveling operation based on a result of tilt detection by the tilt detecting device. Also, the present invention provides the laser sighting device as described above, wherein there are provided a coarse leveling unit for leveling of the main unit and a fine leveling unit for leveling the laser beam irradiation unit independently from the main unit. Further, the present invention provides the laser sighting device as described above, wherein the fixed reflection member is provided on the laser beam irradiation unit. Also, the present invention provides a laser sighting device as describe above, wherein the tilt detecting device comprises a photodetection element, a free liquid light projecting system for projecting a light beam toward the liquid member, a fixed reflection member light projecting system for projecting a light beam to the fixed reflection member, a photodetection optical system for guiding a reflection light beam from the free liquid surface of the liquid member and a reflection light from the fixed reflection member toward a photodetection element, and an arithmetic processing unit for calculating tilting of the main unit from deviation of two reflection images received by the photodetection element. Further, the present invention provides the laser sighting device as described above, wherein a first pattern is provided in the free liquid surface light projecting system, a second pattern is provided in the fixed reflection member light projecting system, and the reflection images are pattern images. Also, the present invention provides the laser sighting device as described above, wherein the first pattern and the second pattern are darkfield patterns. Further, the present invention provides the laser sighting device as described above, wherein the free liquid surface light projecting system and the fixed reflection member light projecting system project linearly polarized light of the same phase, wherein a $\lambda/4$ phase contrast plate is provided in a common optical path for incidence and reflection of the light to and from the liquid member, wherein a $\lambda/4$ phase contrast plate is provided in a common optical path for incidence and reflection of the light to and from the fixed reflection member, and wherein the photodetection optical system comprises a polarization optical member for transmitting only the reflection light from the liquid member and the fixed reflection member. Also, the present invention provides the laser sighting device as described above, wherein direction of polarization of the projected light beam is determined by a polarizing plate. Further, the present invention provides the laser sighting device as described above, wherein the laser beam irradiation unit comprises a laser light source for emitting a laser beam and the laser beam is irradiated by rotary irradiation. Also, the present invention provides the laser sighting device as described above, wherein the laser beam irradiation unit forms at least one spot light beam. Further, the present invention provides the laser sighting device as described above, wherein the laser beam irradiation unit comprises a laser beam splitting means, the laser beam splitting means is a rhombic prism with a right-angle prism on one end thereof, and the one end splits the laser beam to a transmission light and to a reflection light. Also, the present invention provides the laser sighting device as described above, wherein the laser beam irradiation unit irradiates the laser beam through a cylinder lens. Further, the present invention provides the laser sighting device as described above, wherein the laser beam irradiation unit irradiates the laser beam through a cylindrical lens. Also, the present invention provides the laser sighting device as described above, wherein a cross-sectional direction of the incident laser beam entering the cylindrical lens can be changed, and a spreading angle of a fan-shaped laser beam can be changed. Further, the present invention provides the laser sighting device as described above, wherein the fan-shaped laser beam is irradiated to scan over a vertical plane, and the spreading angle of the fan-shaped laser beam is changed depending upon whether central an optical axis of the fan-shaped laser beam is in a vertical direction or in a horizontal direction. Also, the present invention provides the laser sighting device as described above, wherein the laser beam irradiation unit irradiates two fan-shaped laser beams, and the two fan-shaped laser beams are irradiated crossing each other. Further, the present invention provides the laser sighting device as described above, wherein the removable type laser beam irradiation unit can be controlled by remote control operation. Also, the present invention provides the laser sighting device as described above, wherein optical communication is used for remote control operation. Further, the present invention provides the laser sighting device as described above, wherein a light source of the free liquid surface light projecting system and the free liquid surface of the liquid member are arranged in conjugate relationship. Also, the present invention provides the laser sighting device as described above, wherein the free liquid surface light projecting system, the fixed reflection member light projecting system and the photodetection optical system comprise beam splitters, and each of the beam splitters comprises a surface tilted with respect to a transmission light passing through a semi-transmitting surface. Further, the present invention provides the laser sighting device as described above, wherein the liquid member is accommodated in a container, and an upper surface of the container is tilted with respect to the transmission light passing through the free liquid surface. Also, the present invention provides the laser sighting device as described above, wherein the free liquid surface light projecting system comprises a half-mirror for reflecting the laser beam toward the liquid member and for allowing the reflection light from the liquid member to pass, and the half-mirror and the liquid member are optically integrated with each other. Further, the present invention provides the laser sighting device as described above, wherein the half-mirror and the liquid member are optically integrated via an optical member. Also, the present invention provides the laser sighting device as described above, wherein a refractive index of the liquid member is approximately equal to a refractive index of the optical member. Further, the present invention provides the laser sighting device as described above, wherein an anti-reflection membrane is provided between the liquid member and the optical member. Also, the present invention provides the laser sighting device as described above, wherein the free liquid surface light projecting system and the fixed reflection member light projecting system comprise a common light source and a beam splitter for splitting the light beam from the light source to a light beam to be directed toward the liquid member and a light beam directed toward the fixed reflection member. Further, the present invention provides the laser sighting device as described above, wherein there is provided a pattern arranged in such manner that the light beam from the common light source can pass through, and the pattern further comprises a pattern where the light beam to the liquid member can pass through and a pattern where the light beam to the fixed reflection member can pass through.

BRIEF DESCRIPTION OF THE DRAWINGS

FIG. 15(A), FIG. 15(B), and FIG. 15(C) each represents a drawing to show status of a laser beam emitted when the laser beam irradiation unit is provided with a cylindrical lens;

FIG. 16(A), FIG. 16(B), and FIG. 16(C) each represents a drawing to show status of a laser beam emitted when the laser beam irradiation unit is provided with a cylindrical lens;

DETAILED DESCRIPTION OF THE INVENTION

Figure 1:
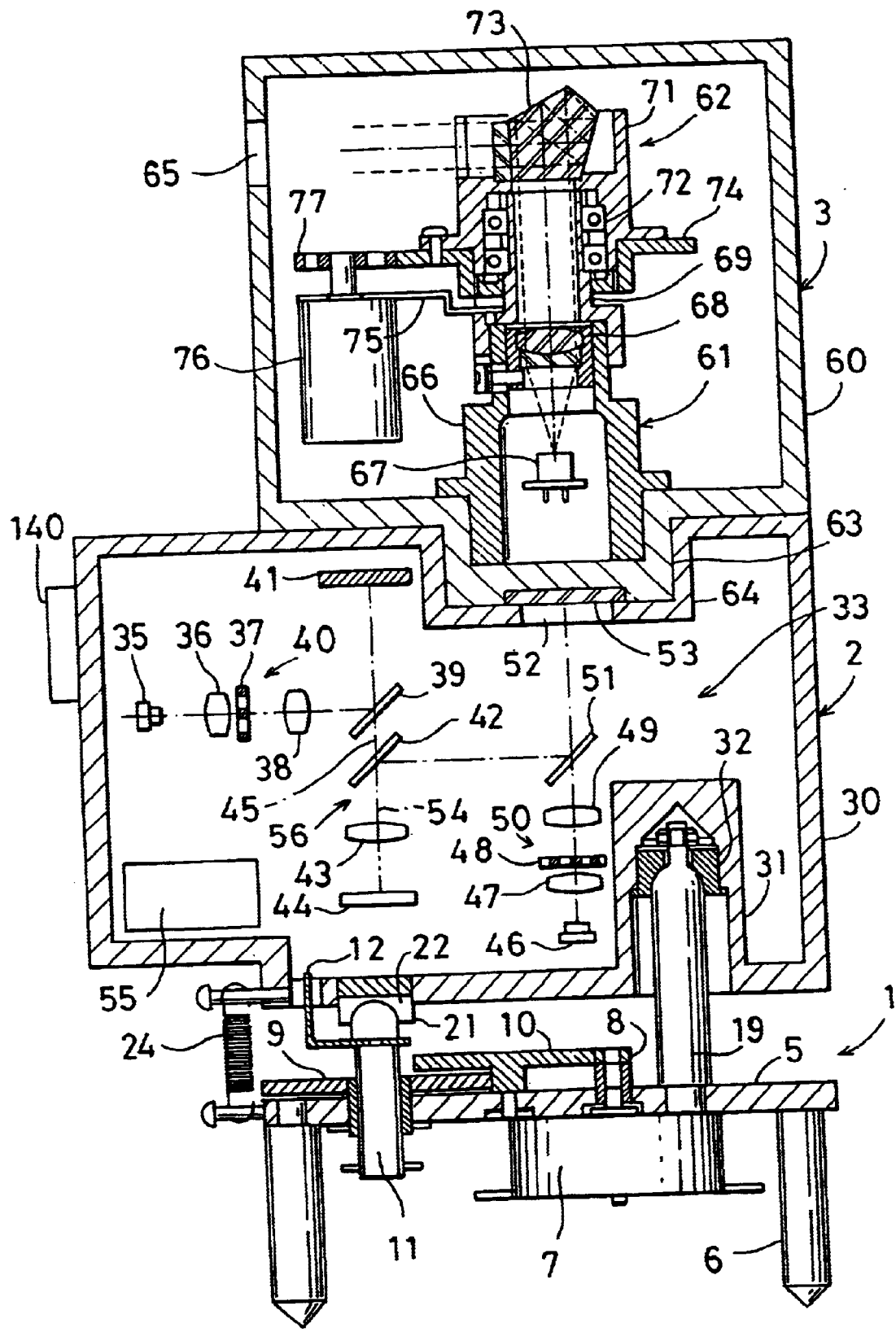
FIG. 1 is a cross-sectional view of an embodiment of the present invention.
Figure 2:
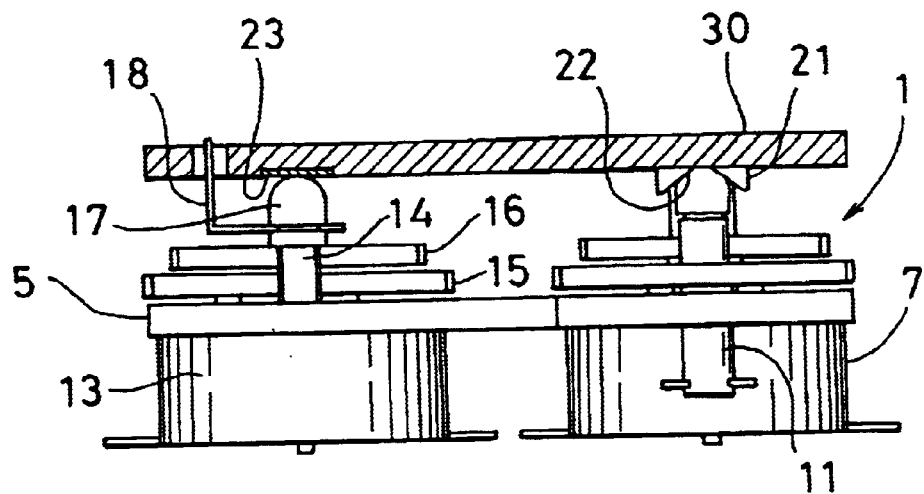
FIG. 2 is a side view of a leveling unit in the above embodiment.

Description will be given below on embodiments of the present invention referring to the drawings.

FIG. 1 shows a schematical arrangement of a first embodiment of the present invention. In this figure, reference numeral 1 denotes a leveling unit, 2 denotes a main unit, and 3 denotes a laser irradiation unit.

First, description will be given on the leveling unit 1.

A fixed baseplate 5 is supported by four pedestal columns 6. On the lower surface of the fixed baseplate 5, a first tilting motor 7 is provided. An output shaft of the first tilting motor 7 is projected upward, and a first driving gear 8 is engaged with the projected end. A first driven gear 9 is rotatably mounted on the fixed baseplate 5. The first driven gear 9 is engaged with the driving gear 8 via a first speed reducing idle gear 10. A nut is formed at the center of the first driven gear 9, and a first tilting rod 11 is screwed through the first driven gear. Its upper end is projected and is formed in a spherical shape. An L-shaped locking member 12 is fixed on the first tilting rod 11. The locking member 12 is slidably penetrating a bottom portion of a housing 30 of the main unit 2. The locking member 12 can be moved freely up and down, while the locking member 12 is restricted from rotating.

A second tilting motor 13 is provided on the lower surface of the fixed baseplate 5. An output shaft of the second tilting motor 13 is projected upward, and a second driving gear 14 is engaged with the projected end. A second driven gear 15 is rotatably mounted on the fixed baseplate 5, and the second driven gear 15 is engaged with the second driving gear 14 via a second speed reducing idle gear 16. A nut is formed at the center of the second speed reducing idle gear 16, and a second tilting rod 17 is screwed through the second speed reducing idle gear. The upper end of the second tilting rod 17 is projected and is formed in a spherical shape. An L-shaped locking member 18 is fixed on the second tilting rod 17. The locking member 18 is slidably penetrating the bottom portion of the housing 30 of the main unit 2. It can be moved freely up and down, while it is restricted from rotating.

A support pillar 19 is erected on the fixed baseplate 5 so that the first tilting rod 11 and the second tilting rod 17 are positioned at an equal distance. The support pillar 19 is arranged at such position to the first tilting rod 11 and the second tilting rod 17 that the support pillar 19 is positioned at an intersection of rectangular coordinates, and the first tilting rod 11 and the second tilting rod 17 are positioned on axes of the coordinates respectively.

A cylindrical recess 31 is formed at the bottom of the housing 30, and a spherical seat 32 is provided on the upper end of the recess 31. The upper end of the support pillar 19 is designed in a spherical shape. The support pillar 19 is inserted into the recess 31, and its upper end is rotatably touched to the spherical seat 32.

The housing 30 is supported at three points, i.e. by the first tilting rod 11, the second tilting rod 17, and the support pillar 19, and the housing 30 can be tilted in two directions with the support pillar 19 at the center.

A V-block 21 is mounted on the lower surface of the housing 30. The upper end of the first tilting rod 11 is in contact with a V-groove 22 of the V-block 21. The center of the V-grove 22 is in a plane, which includes an axis of the first tilting rod 11 and an axis of the support pillar 19.

A slide guide 23 is provided on the lower surface of the housing 30, and the upper end of the second tilting rod 17 is slidably touched to the slide guide 23.

A spring 24 is stretched between the fixed baseplate 5 and the housing 30, and the spring resiliently pushes the lower surface of the housing 30 in a downward direction, i.e. the spring pushes the V-block 21 toward the upper end of the first tilting rod 11. The spring also pushes the slide guide 23 toward the upper end of the second tilting rod 17.

When the first tilting motor 7 is driven, the first tilting rod 11 is moved in an upward or downward direction, and the housing 30 is tilted with the support pillar 19 at the center. When the second tilting motor 13 is driven, the second tilting rod 17 is moved in an upward or downward direction, and the housing 30 is tilted with the support pillar 19 at the center. The forward end of the first tilting rod 11 is engaged with the V-groove 22, and the housing 30 is prevented from rotating in a horizontal direction, and it can be tilted accurately in the two directions by the driving of the second tilting motor 13 and the first tilting motor 7.

The main unit 2 comprises at least a differential type tilt detection device 33, an arithmetic processing unit 55 and a display unit 140.

In the following, description will be given on the tilt detecting device 33.

There is provided a first light source 35, e.g. an LED, for emitting a light beam in a horizontal direction. On an optical axis of the light beam projected from the first light source 35, a first condenser lens 36, a first pattern 37, a second condenser lens 38, and a first half-mirror 39 are arranged. A liquid member 41 is provided on an optical axis of the light beam reflected from the first half-mirror 39, and the liquid member 41 is placed in a container (not shown) so that it forms a free liquid surface. As the liquid member 41, a type of liquid having adequate viscosity, e.g. silicone oil, is used. The first light source 35 and the liquid member 41 can be arranged at a position conjugate to the free liquid surface.

The first light source 35, the first condenser lens 36, the first pattern 37, the second condenser lens 38, and the first half-mirror 39, etc. make up together a free liquid surface light projecting system 40.

The laser beam reflected by the first half-mirror 39 is reflected by the free liquid surface of the liquid member 41 and passes through the first half-mirror 39. A second half-mirror 42, a third condenser lens 43, and photodetection means 44 are arranged on an optical axis 45 of the transmission light from the first half-mirror 39. A linear sensor is used, for instance, as the photodetection means 44.

There is provided a second light source 46, which has a projection light optical axis in parallel to the transmission light optical axis 45 of the first half-mirror 39. A fourth condenser lens 47, a second pattern 48, a fifth condenser lens 49, and a third half-mirror 51 are arranged on the projection light optical axis of the second light source 46, and the third half-mirror 51 is at a position facing toward the second half-mirror 42. A reflection opening 52 is formed at a position facing toward the third half-mirror 51 on upper part of the housing 30, and a reflection member 53 (to be described later) is placed adjacent to the reflection opening 52.

The second light source 46, the fourth condenser lens 47, the second pattern 48, the fifth condenser lens 49, and the third half-mirror 51, etc. make up together a fixed reflection member light projection system 50. The first half-mirror 39, the second half-mirror 42, the third half-mirror 51, the third condenser lens 43, and the photodetection means 44, etc. make up together a photodetection optical system 56.

The light beam emitted from the second light source 46 passes through the fourth condenser lens 47, the second pattern 48, the fifth condenser lens 49, and the third half-mirror 51, and the light beam is reflected by the reflection member 53. Then, the light beam is reflected by the third half-mirror 51 and the second half-mirror 42. Further, the light beam passes through the third condenser lens 43 and is received by the photodetection means 44. A reflection light optical axis 54 of the reflection light from the reflection member 53 as reflected by the second half-mirror 42 is aligned with the transmission light optical axis 45 when the transmission light optical axis 45 runs in a vertical direction.

As to be described later in detail, the transmission light optical axis 45 is the optical axis of the light reflected by the free liquid surface of the liquid member 41. Therefore, when the main unit 2 is tilted, the free liquid surface of the liquid member 41 is relatively tilted with respect to the main unit 2. As a result, the reflection light optical axis is deflected, and a photodetecting position at the photodetection means 44 is displaced. By detecting an amount of this displacement, it is possible to detect tilting of the main unit 2.

Next, the projection light optical axis of the second light source 46 is fixed with respect to the main unit 2. Therefore, if the reflection member 53 is relatively tilted with respect to the main unit 2, the reflection light optical axis of the reflection light reflected by the reflection member 53, i.e. the reflection optical axis 54, is deflected, and a photodetecting position on the photodetection means 44 is displaced. By detecting an amount of this displacement, it is possible to detect tilting of the reflection member 53 with respect to the main unit 2. If the reflection member 53 is fixed on and integrated with the laser beam irradiation unit 3, it is possible to detect tilting of the laser beam irradiation unit 3 with respect to the main unit 2.

A photodetection signal from the photodetection means 44 is inputted to the arithmetic processing unit 55. At the arithmetic processing unit 55, tilting of the free liquid surface of the liquid member 41 or tilting of the reflection member 53 is calculated. Based on the result of the calculation, the first tilting motor 7 and the second tilting motor 13 are driven and controlled, and the tilting of the main unit 2 is adjusted. The calculation result of the arithmetic processing unit 55, i.e. result of tilting detection by the tilt detecting device 33, is displayed on the display unit 140. The data to be displayed are: angular deviation of the free liquid surface of the liquid member 41 from the reflection member 53, alarm display when the angular deviation exceeds an allowable value or a preset value, a tilt angle of the entire laser sighting device, etc.

Now, description will be given on the laser beam irradiation unit 3.

The laser beam irradiation unit 3 is removably attached to the main unit 2 by socket and spigot joint method. It is designed in such manner that when the laser beam irradiation unit 3 is mounted on the main unit 2, the laser beam irradiation unit 3 and the main unit 2 can be almost positioned.

The laser beam irradiation unit 3 comprises a casing 60, and a projection unit 61 and a rotating unit 62 accommodated in the casing 60.

The casing 60 has a hollow engaging portion 63 projecting from its base, and the hollow engaging portion 63 is engaged with an engaging recess 64 formed on upper surface of the housing 30. The reflection opening 52 is formed at the base of the engaging recess 64, and the reflection member 53 is mounted on the bottom surface of the hollow engaging portion 63 so that the reflection member 53 runs perpendicularly to the projection light optical axis of the projecting unit 61. On side wall of the casing 60, a light projection window 65 is formed. As to be described later, the laser beam is projected through the light projection window 65.

A hollow light source holder 66 is placed in and fixed on the hollow engaging unit 63. A laser light source 67 and a condenser lens 68 are held in the light source holder 66, and it is designed in such manner that optical axes of the laser light source 67 and the condenser lens 68 will be consistent with the projection light optical axis of the second light source 46. A hollow rotation shaft 69 is fixed on the upper end of the light source holder 66, and a prism holder 71 is rotatably mounted via bearings 72 on the hollow rotation shaft 69. A pentagonal prism 73 is fixed in the prism holder 71. The laser beam emitted from the laser light source 67 is deflected by the pentagonal prism 73 in a perpendicular direction (horizontal direction) and the laser beam is further projected through the light projection window 65. The light source holder 66, the laser light source 67, the condenser lens 68, and the hollow rotation shaft 69, etc. make up together the light projection unit 61. As described above, the reflection member 53 lies perpendicularly to the optical axis of the light from the laser light source 67. By positioning the reflection member 53 in the horizontal direction, the projecting direction of the laser beam is set to the horizontal direction.

A scanning driven gear 74 is engaged with the hollow rotation shaft 69. A motor bracket 75 extending in a horizontal direction is mounted on the hollow rotation shaft 69, and a scanning motor 76 is mounted on the motor bracket 75. A scanning driving gear 77 is mounted on an output shaft of the scanning motor 76, and the scanning driving gear 77 is engaged with the scanning driven gear 74. When the scanning motor 76 is driven, the pentagonal prism 73 is rotated over the total circumference via the scanning driving gear 77 and the scanning driven gear 74, or the pentagonal prism is reciprocally rotated within a predetermined range. By the laser beam projected from the pentagonal prism 73, a laser beam reference plane is formed over the total circumference or within the predetermined range. The prism holder 71, the pentagonal prism 73, the scanning driven gear 74, the scanning motor 76, and the scanning driving gear 77, etc. make up together the rotating unit 62. Although it is not particularly shown in the figure, an encoder is integrally provided with the scanning driven gear 74. From the encoder, a rotation angle of the prism holder 71 is obtained, and the projecting direction of the laser beam from the pentagonal prism 73 can be detected.

Detailed description will be given below on operation of the tilt detecting device 33.

Figure 3:
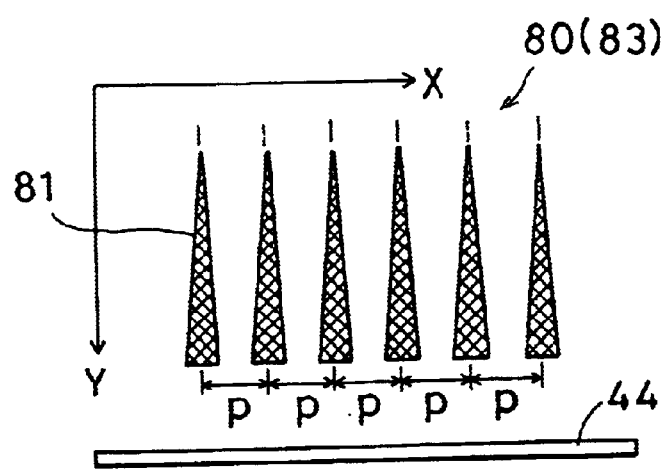
FIG. 3 is a drawing to explain a darkfield pattern used in the present embodiment.

The first pattern 37 is produced by forming an opaque pattern on a transparent substrate or by perforating a pattern on an opaque substrate. A darkfield pattern 80 is shown, for instance, in FIG. 3.

The darkfield pattern 80 is a row of slits formed by perforating slits 81 with a predetermined equal spacing (pitch p) between them. It is supposed now that a direction of the row of slits is X-axis direction, for instance. Each of the slits 81 is formed in an oblong triangular shape with its width gradually reduced in one direction, and its longitudinal direction is aligned with Y-axis direction. As the photo-detection means, a CCD linear sensor 44 may be used, for instance, and the direction of the linear sensor 44 is aligned with X-axis.

The tilt detecting device 33 can detect tilting of the free liquid surface of the liquid member 41, i.e., tilting of the main unit 2, and tilting of the reflection member 53, i.e., and tilting of the laser beam irradiation unit 3 with respect to the main unit 2.

First, description will be given on tilting of the free liquid surface of the liquid member 41.

The light beam emitted from the first light source 35 passes through the first condenser lens 36, the first pattern 37, the second condenser lens 38, and the first half-mirror 39 and enters the liquid member 41, and the light beam is reflected by the free liquid surface. The reflection light passes through the first half-mirror 39, the second half-mirror 42, the third condenser lens 43 and is projected to the linear sensor 44. That is, the darkfield pattern 80 is projected to the linear sensor 44. When the tilt detecting device 33 is tilted, an image of the darkfield pattern 80 on the liquid member 41 is moved in proportion to the tilt angle because the free liquid surface of the liquid member 41 is maintained in the horizontal direction.

Figure 4:
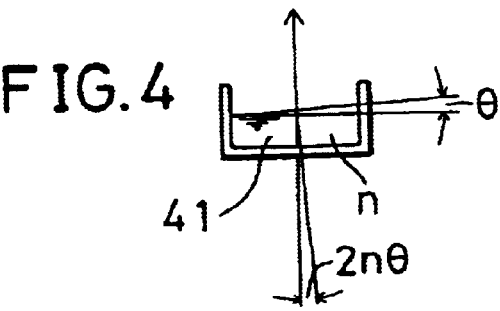
FIG. 4 is a drawing to show a deflection angle between an incident light entering a liquid member used in the present embodiment and a reflection light when a free liquid surface is tilted.

When the tilt detecting device 33 is tilted at an angle of $\theta$, the reflection light from the free liquid surface is tilted at an angle of $2n\theta$ (where n is a refractive index of the liquid member 41) as shown in FIG. 4. If it is supposed now that a distance on the linear sensor 44, i.e. the photodetection means, is L:

$$L = f \times \tan(2n\theta) \quad (1)$$

Therefore, if the amount of movement of the slits 81 of the darkfield pattern 80 is detected by the photodetection means 44 and this is converted to a tilt angle by the arithmetic processing unit 55, it is possible to determine a tilt angle $\theta$ of the tilt detecting device 33.

Next, description will be given on calculation of the amount of movement (the distance L on the linear sensor 44).

The linear sensor 44 is positioned in a direction perpendicular to the row of images of a plurality of slits 81, 81, . . . (i.e. in X-axis direction).

Figure 5:
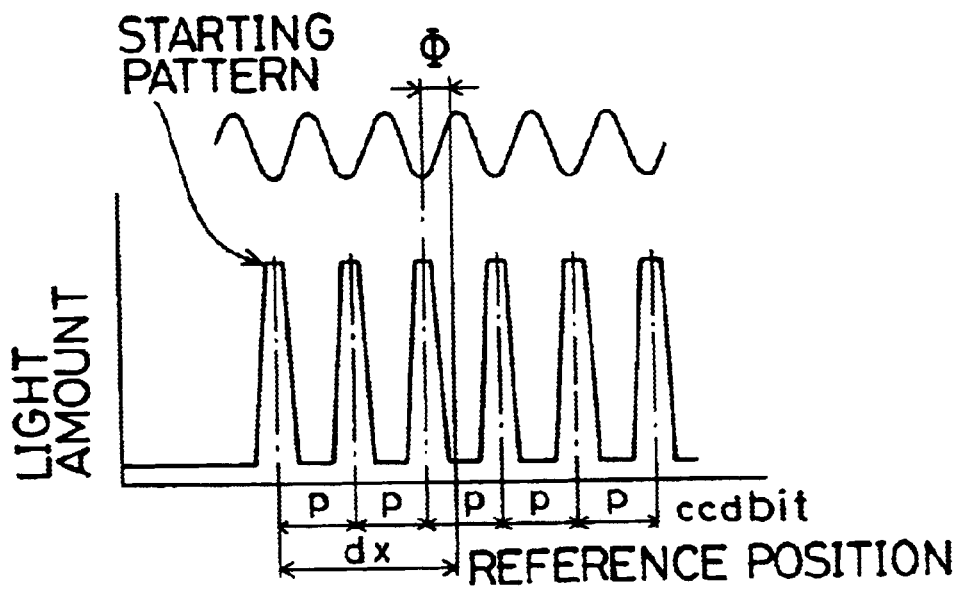
FIG. 5 is a diagram to explain a photodetection signal of photodetection means in the above embodiment.

As shown in FIG. 5, by taking notice of a specific pattern of the slits 81, 81, . . . as a starting pattern, a distance dx from a horizontal reference position as set in advance should be determined.

For a distance smaller than the pitch spacing, a phase difference $\phi$ from the horizontal reference position with respect to the pitch spacing is calculated by Fourier transform of the output of the linear sensor 44.

$$\phi \times p / (2\pi) \quad (2)$$

By obtaining the value of $\phi$ from the equation (2), it is possible to accurately determine the distance shorter than the pitch spacing. By adding this to the distance longer than the pitch spacing as obtained from the distance of the starting pattern, the total distance can be calculated.

Next, regarding the tilt angle in Y-direction, the tilt angle in Y-axis direction is calculated from the triangular slit 81 with its width gradually changing.

That is, the linear sensor 44 is positioned in X-axis direction. When it is tilted in Y-axis direction, the width of the triangular slit 81 is changed. The amount of this change is proportional to the tilt angle in Y-axis direction, and the arithmetic processing unit 55 can calculate the tilt angle in Y-axis direction based on the amount of change in the width.

Figure 6:
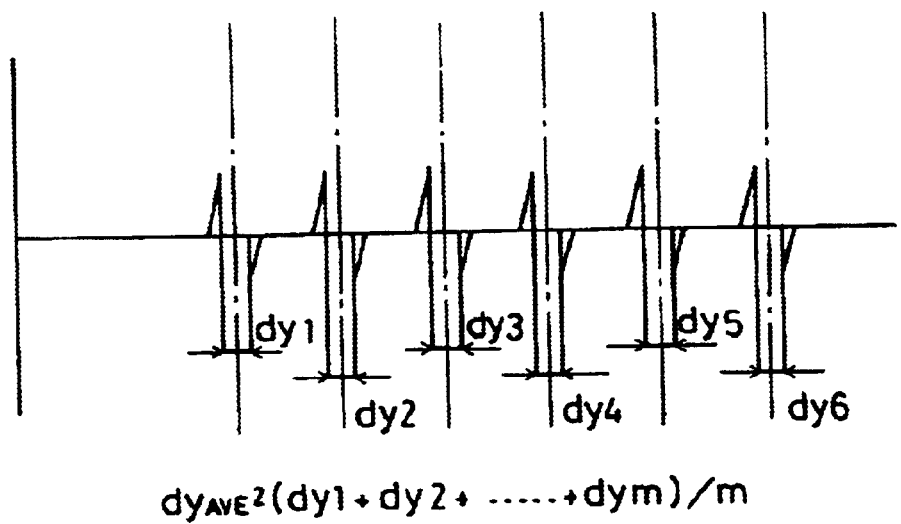
FIG. 6 is a diagram to explain a signal when the photodetection signal is differentiated.

To measure the width in Y-axis direction, distance of leading and trailing edges can be measured by differentiating the output of the linear sensor 44 as shown in FIG. 6. To ensure higher measurement accuracy, calculation is made on all signals and average width $dy_{ave}$ is determined. Using the pitch width p obtained by Fourier transform and also using proportional relationship k determined in advance, the distance L on the linear sensor 44 can be obtained from the following equation (3):

$$L = k \times dy_{ave} / p \quad (3)$$

Further, from the equation (1), the tilting in Y-axis direction can be calculated.

The slit 81 with its width gradually changing is not limited to a triangular slit. It may be in any shape so far as the width is gradually changed and the correspondence to the tilting is set.

As described above, by simply using a single linear sensor 44, it is possible to detect tilting in two directions, i.e. in X-axis direction and in Y-axis direction.

If an area sensor is adopted instead of the linear sensor, positional change on two axes can be detected from the change of position of the light beam on the area sensor, and the darkfield pattern 80 may not be used.

Further, a suspension member moving freely may be used instead of the liquid member 41 having the free liquid surface.

Description will be given now on the light beam emitted from the second light source 46.

The light beam emitted from the second light source 46 is turned to the parallel beam by the fourth condenser lens 47. The beam passes through the second pattern 48, the fifth condenser lens 49, and the third half-mirror 51 and enters the reflection member 53. After being reflected by the reflection member 53, the light beam is reflected by the third half-mirror 51 and the second half-mirror 42. Then, the beam passes through the third condenser lens 43 and is received by the linear sensor 44. The light beam emitted from the second light source 46 forms an image on the linear sensor 44 by means of the fifth condenser lens 49 and the third condenser lens 43. On the second pattern 48, a darkfield pattern 83 similar to the first pattern 37 is formed (see FIG. 3).

The light beam from the first light source 35 reflected by the free liquid surface of the liquid member 41 and the light beam from the second light source 46 reflected by the reflection member 53 enter the linear sensor 44 at the same time.

When the main unit 2 is not tilted and the laser beam irradiation unit 3 is accurately mounted with respect to the main unit 2, the darkfield pattern 80 of the first pattern 37 projected on the linear sensor 44 is aligned with the darkfield pattern 83 of the second pattern 48. That is, both the darkfield pattern 80 and the darkfield pattern 83 are projected to the horizontal reference position.

When the main unit 2 is tilted, the free liquid surface of the liquid member 41 is relatively tilted with respect to the main unit 2 because the free liquid surface of the liquid member 41 is maintained in the horizontal direction. Because the reflection member 53 is fixed with respect to the main unit 2, only the light beam from the first light source 35 is deflected. Thus, the darkfield pattern 80 is deviated from the darkfield pattern 83 on the linear sensor 44 (i.e. the light beam of the first light source 35 is deviated from the light beam from the second light source 46).

Therefore, by detecting the amount of deviation between the darkfield pattern 80 and the darkfield pattern 83, the tilting of the tilt detecting device 33, i.e. the tilting of the main unit 2, can be detected from the equation (1). The darkfield pattern 83 serves as a horizontal reference position when the distance dx is measured.

The free liquid surface formed by the liquid member 41 is always in the horizontal position regardless of the status of the tilt detecting device 33 (i.e. the main unit 2). If the leveling unit 1 is controlled in such manner that the free liquid surface runs in parallel to the reflection surface of the reflection member 53, it is possible to obtain a horizontal irradiation plane.

Here, there may be a case where the reflection surface of the reflection member 53 is not always strictly perpendicular to the optical axis of the light from the laser light source 67 due to the reasons such as an assembling error. However, if the reflection surface of the reflection member 53 runs almost perpendicularly to the optical axis of the light from the laser light source 67, it is possible to maintain perpendicularity of the optical axis and to maintain the rotary irradiation plane in the horizontal position by offsetting the assembling error as an offset value during the leveling operation.

By the structure as described above, it is possible to have accuracy enough to always maintain in the horizontal position even when the laser beam irradiation unit 3 is designed in a removable structure.

If the laser beam irradiation unit 3 is designed, not in a structure to be mounted in the vertical direction as shown in FIG. 1, but in such a structure that the laser beam irradiation unit 3 is removable in the horizontal direction, a vertical plane can be obtained by the rotary irradiation plane.

Instead of the arrangement to be controlled by the leveling unit 1 or in combination with such arrangement, in case there is the angular difference higher than the allowable range between the free liquid surface of the liquid member 41 and the reflection member 53, it may be designed in such manner that an alarm or a display is given to indicate that the angular difference exceeds the allowable range. Thus, it is possible to obtain an optical axis or a rotary irradiation plane to be set with accuracy within the allowable range.

Now, referring to FIG. 7, description will be given on a second variation of the tilt detecting device 33.

Figure 7:
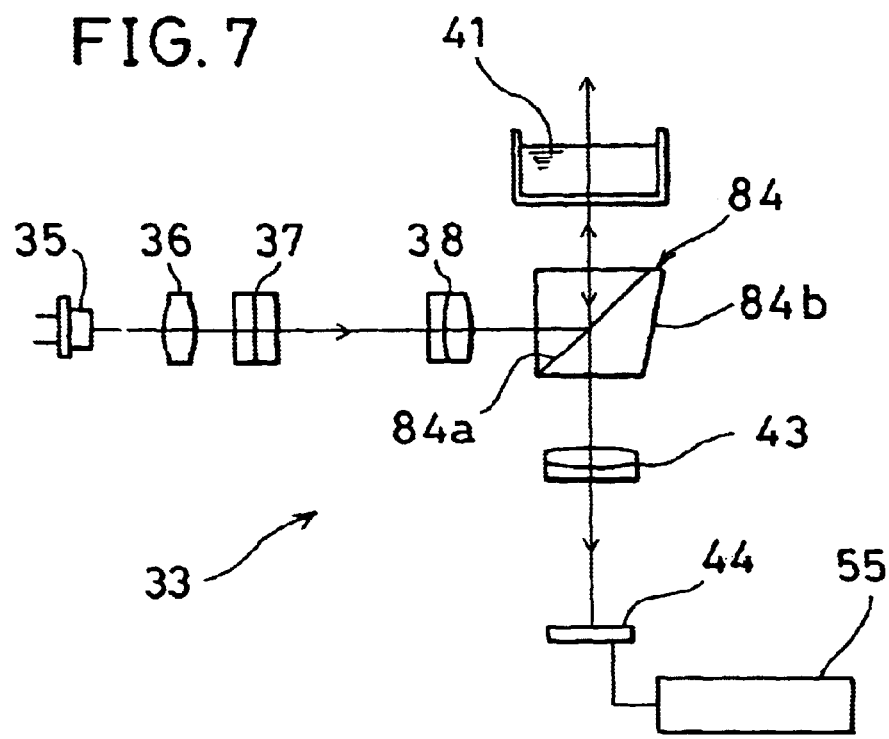
FIG. 7 is a block diagram of a second variation of a tilt detection unit in the present embodiment.

In FIG. 7, the same component as in FIG. 1 is referred by the same symbol, and detailed description is not given here.

In the variation shown in FIG. 7, the first half-mirror 39 is replaced by a beam splitter 84 having a semi-transmitting plane 84a. The beam splitter 84 has a plane 84b tilted with respect to the transmission light of the semi-transmitting plane 84a coming from the first light source 35.

By the plane 84b, the light beam passing through the semi-transmitting surface 84a is deflected from the incident light optical axis and the light beam is reflected. As a result, a reflection light from the surface 84b does not enter the linear sensor 44. Thus, noise is decreased in the light beam received by the linear sensor 44.

Figure 8:
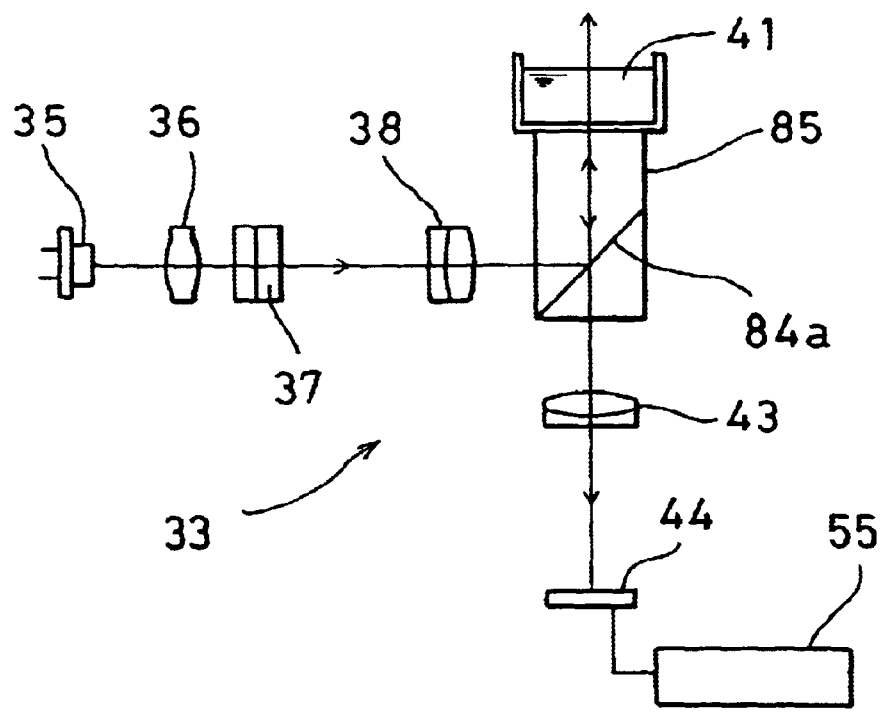
FIG. 8 is a block diagram of a third variation of a tilt detection unit in the present embodiment.

Referring to FIG. 8, description will be given on a third variation of the tilt detecting device 33.

In FIG. 8, the same component as in FIG. 1 is referred by the same symbol, and detailed description is not given here.

In FIG. 8, there is provided an optical member 85, which integrates the semi-transmitting surface 84a and the liquid member 41. The optical member 85 has a refractive index, which is equal or similar to that of the liquid member 41. For this reason, reflection and refraction on a boundary surface between the liquid member 41 and the optical member 85 are prevented. As a result, unnecessary generation of the reflection light can be prevented, and measurement can be made with high accuracy.

When the refractive indexes are different between the optical member 85 and the liquid member 41, the reflection light at the boundary surface can be decreased by providing an anti-reflection membrane using a medium, which has a refractive index between the refractive index of the optical member 85 and that of the liquid member 41.

Figure 9:
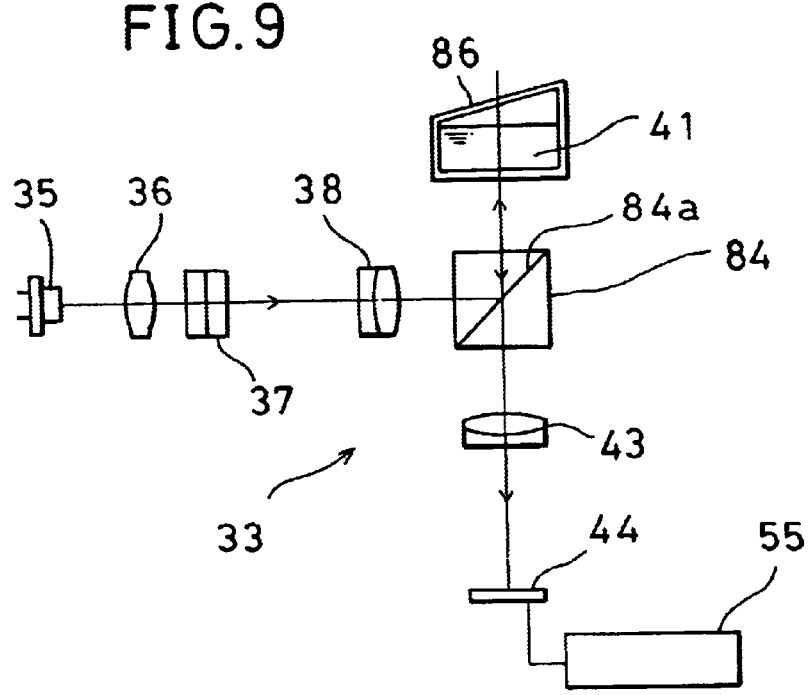
FIG. 9 is a block diagram of a fourth variation of a tilt detection unit in the present embodiment.

Referring to FIG. 9, description will be given below on a fourth variation of the tilt detecting device 33.

In FIG. 9, the same component as in FIG. 1 is referred by the same symbol, and detailed description is not given here.

The fourth variation shows a case where the liquid member 41 is sealed in a container 86.

An upper surface of the container 86, i.e. an upper inner surface facing to the free liquid surface of the liquid member 41, is tilted with respect to the free liquid surface.

The photodetection means 44 receives the reflection light reflected by the free liquid surface, while most of the light beam (90% or more) entering the liquid member 41 passes through the free liquid surface. For this reason, compared with the amount of the light reflected by the free liquid surface, the amount of the reflection light reflected by the upper surface of the container 86 is not a negligible value. By tilting the upper inner surface of the container 86, the reflection light reflected by the upper inner surface of the container 86 is deflected, and it is deviated from the reflection light reflected by the free liquid surface. Thus, the reflection light reflected by the upper inner surface of the container 86 is not received by the photodetection means 44.

Therefore, S/N ratio of the light received at the photodetection means 44 is increased, and the measurement accuracy can be improved.

Figure 10:
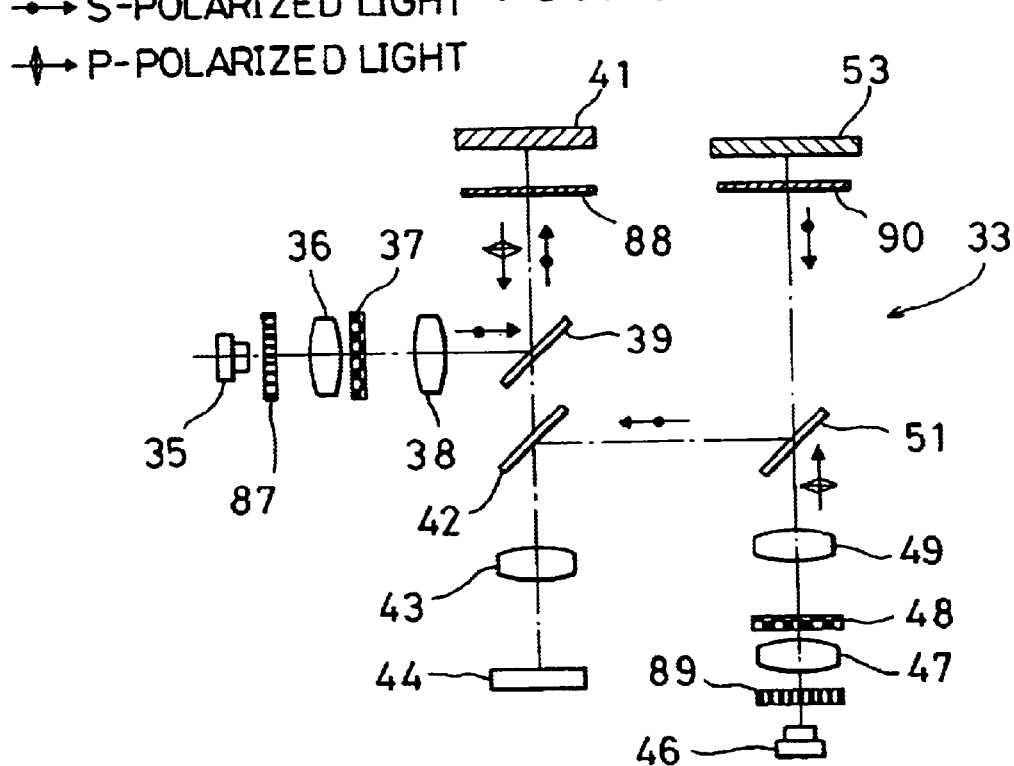
FIG. 10 is a block diagram of a fifth variation of a tilt detection unit in the present embodiment.

Referring to FIG. 10, description will be given below on a fifth variation of the tilt detecting device 33.

In FIG. 10, the same component as in FIG. 1 is referred by the same symbol, and detailed description is not given here.

In the fifth variation of the tilt detecting device 33, a polarization member is added to the arrangement shown in FIG. 1. This is to improve efficiency of transmission and reflection of the first half-mirror 39 and the third half-mirror 51 in the embodiment shown in FIG. 1.

A first polarizing plate 87 is arranged between the first light source 35 and the first condenser lens 36, and a first λ/4 polarization member 88 is disposed between the liquid member 41 and the first half-mirror 39. Similarly, a second polarizing plate 89 is arranged between the second light source 46 and the fourth condenser lens 47, and a second λ/4 polarization member 90 is disposed between the reflection member 53 and the third half-mirror 51. Also, a polarization beam splitter is used as each of the first half-mirror 39, the second half-mirror 42 and the third half-mirror 51. The first half-mirror 39, the second half-mirror 42, and the third half-mirror 51 reflect a S-polarized light and transmit a P-polarized light respectively.

As the light source, a light source such an LED, etc. is used so as not to define polarization.

The light beam emitted from the first light source 35 is turned to a linearly polarized S-polarized light by the first polarizing plate 87 and enters the first half-mirror 39. As described above, the first half-mirror 39 serves as a polarization beam splitter, which reflects the S-polarized light and transmits the P-polarized light. Therefore, the light beam from the first light source 35 is reflected toward the liquid member 41. The light beam reflected by the liquid member 41 passes through the first λ/4 polarization member 88 twice, and the light beam is turned to a linearly polarized S-polarized light. Therefore, the light beam passes through the first half-mirror 39 and the second half-mirror 42 and is received by the photodetection means 44.

The light beam emitted from the second light source 46 is a linearly polarized P-polarized light. The light beam passes through the third half-mirror 51 and is reflected by the reflection member 53. When the light beam is reflected by the reflection member 53, it passes through the second λ/4 polarization member 90 twice, and the reflection light is turned to a S-polarized light. Therefore, the light beam is reflected by the third half-mirror 51 and the second half-mirror 42 and is received by the photodetection means 44.

As described above, reflection and transmission are performed using the polarized light. This contributes to the improvement of efficiency and to the increase of the receiving light amount at the photodetection means 44. As a result, measurement accuracy is improved.

If a light source for emitting a linearly polarized laser beam such as a semiconductor laser is used, the first polarizing plate 87 and the second polarizing plate 89 can be omitted.

Figure 11:
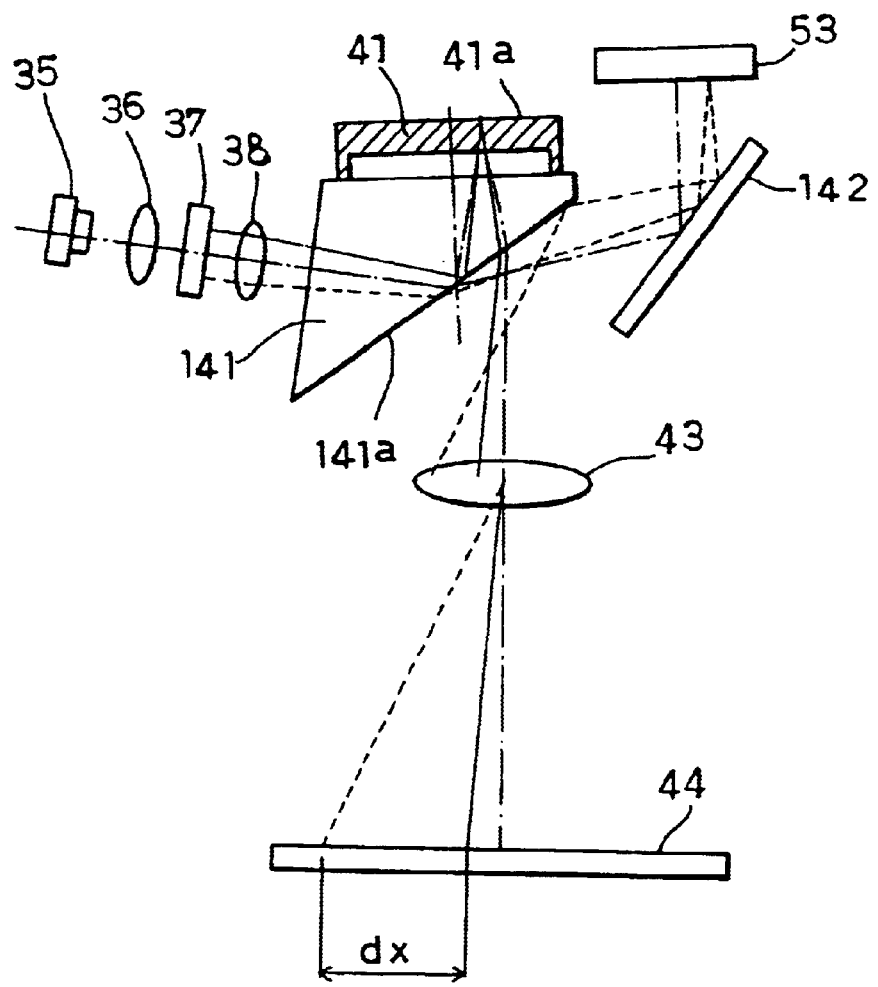
FIG. 11 is a block diagram of a sixth variation of a tilt detection unit in the present embodiment.
Figure 12:
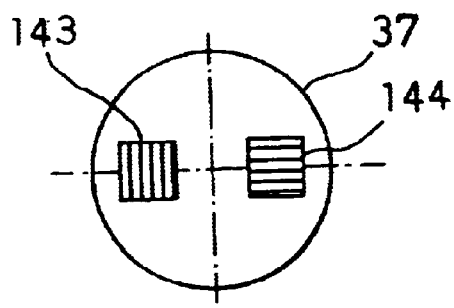
FIG. 12 is a drawing to show a pattern used in the sixth variation.

Referring to FIG. 11 and FIG. 12, description will be given on a sixth variation of the tilt detecting device.

In this variation, it is designed in such manner that a single light source is used to serve as the first light source 35 and the second light source 46 in the first embodiment shown in FIG. 1.

The first condenser lens 36, the first pattern 37, and the second condenser lens 38 are arranged sequentially on the optical axis of the first light source 35, and there are provided a beam splitter 141 facing to the second condenser lens 38 and the liquid member 41, which is sealed in a container (not shown) and disposed on the upper surface of the beam splitter 141. A reflection means 142 such as a mirror is arranged opposite to the second condenser lens 38 with the beam splitter 141 between the reflection means 142 and the second condenser lens 38, and the reflection member 53 is disposed to face to the reflection surface of the reflection means 142. The reflection member 53 is mounted on a fixed structural member such as the housing 30 of the main unit 2. It is designed in such manner that the reflection surface is positioned in the horizontal direction when the main unit 2 is set to the horizontal position.

To face toward the free liquid surface 41a of the liquid member 41, the third condenser lens 43 and further the photodetection means 44 are provided.

On the first pattern 37, patterns 143 and 144 are formed respectively on each side with the optical axis between them. The optical arrangement is determined in such manner that the light beam passing through the pattern 143 is directed toward the liquid member 41 and the light beam passing through the pattern 144 is directed toward the reflection member 53.

The first light source 35, the first condenser lens 36, the first pattern 37, the second condenser lens 38, and the beam splitter 141 make up together a free liquid surface light projection system. The first light source 35, the first condenser lens 36, the first pattern 37, the second condenser lens 38, the beam splitter 141, and the reflection means 142 make up together a fixed reflection member light projection system. The beam splitter 141 and the third condenser lens 43 make up together a photodetection optical system.

The light beam emitted from the first light source 35 is turned to the parallel beam by the first condenser lens 36, and the parallel beam passes through the first pattern 37.

Among the parallel beam passing through the first pattern 37, a light beam passing through the pattern 143 is reflected by a semi-transmitting surface 141a of the beam splitter 141 and reaches the free liquid surface 41a. The first pattern 37 and the free liquid surface 41a are arranged at positions conjugate to each other, and an image of the pattern 143 is formed on the free liquid surface 41a. The light beam reflected by the free liquid surface 41a and passing through the semi-transmitting surface 141a forms an image on the photodetection means 44 by the third condenser lens 43.

The light beam passing through the pattern 144 passes through the semi-transmitting surface 141a and is reflected and deflected by the reflection means 142 and is directed toward the reflection member 53. Further, the light beam reflected by the reflection member 53, the reflection means 142, and the semi-transmitting surface 141a forms an image on the photodetection means 44 by the third condenser lens 43.

The images of the pattern 143 reflected by the free liquid surface 41a and the pattern 144 reflected by the reflection member 53 are formed on the photodetection means 44 at the same time.

When the tilt detecting device itself is tilted, the free liquid surface 41a is maintained in the horizontal direction, and it is relatively tilted with respect to the tilt detecting device itself.

The optical system as described above is fixed on and integrated with the tilt detecting device itself, and the photodetecting position of the pattern 143 on the photodetection means 44 is moved in association with the tilting.

The amount of movement can be given from the equation (1) as described above, i.e.

$$L = f \times \tan(2n\theta)$$

where θ is a tilt angle of the free liquid surface 41a, n is a refractive index of the liquid, and f is a focal length of the third condenser lens 43.

On the other hand, the pattern 144 reflected by the reflection member 53 is not changed even when the main unit 2 is tilted, and the photodetecting position on the photodetection means 44 is not changed. Therefore, by finding displacement of the positions of the images of the patterns 143 and 144, it is possible to obtain tilt angle of the main unit 2.

Next, when the reflection member 53 is mounted on an assembly or a component, which is removably mounted on the main unit 2, the reflection member 53 should be positioned in parallel to the free liquid surface 41a for the purpose of maintaining the assembly or the component at a horizontal position. Therefore, if it is supposed that deviation between the photodetecting position of the pattern 143 received by the photodetection means 44 and the photodetecting position of the pattern 144 is 0, the free liquid surface 41a and the reflection member 53 run in parallel to each other. Thus, the main unit 2 should be leveled in such direction that the deviation will be 0. Accordingly, when a plurality of assemblies or components are removably mounted on the main unit 2 and are used, the equipment can be used with the horizontal position adequately compensated and with high accuracy.

In the following, description will be given further on the laser beam irradiation unit 3.

Figure 13:
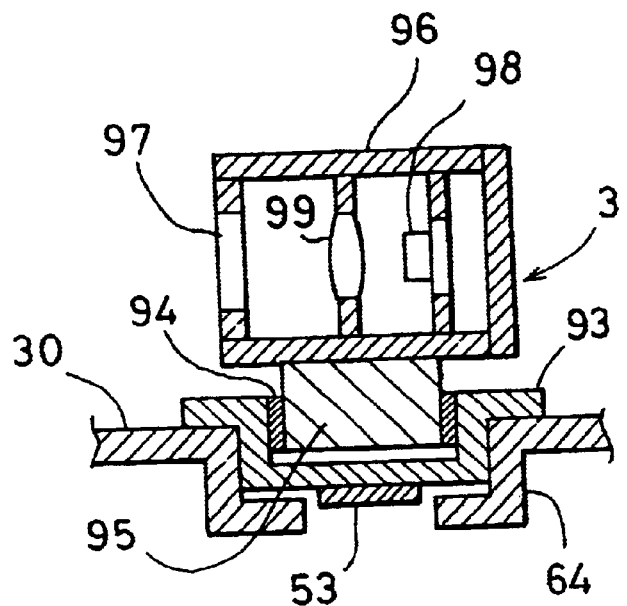
FIG. 13 is a cross-sectional view of a second variation of a laser beam irradiation unit in the above embodiment.

FIG. 13 shows a second variation of the laser beam irradiation unit.

In FIG. 13, the same component as shown in FIG. 1 is referred by the same symbol, and detailed description is not given here.

An engaging base 93 is removably engaged with the engaging recess 64 of the housing 30. A rotation shaft 95 is rotatably mounted on the base 93 via rotation bearings 94, and a light source holder 96 is fixed on the rotation shaft 95. The light source holder 96 is designed in a cylindrical shape. A light projection window 97 is formed on one side, and there are provided a laser light source 98 using the center line of the projection window 97 as a light projection optical axis, and a condenser lens 99. The condenser lens 99 forms a parallel laser beam or focuses the light at a finite distance as required.

On the lower surface of the base 93, the reflection member 53 is provided in parallel to the light projection optical axis to reflect the light beam from the second light source 46 (see FIG. 1). Inside the housing 30, there is provided the tilt detecting device 33 as shown in FIG. 1.

The laser irradiation unit 3 composed as described above is removable with respect to the housing 30. The tilt detecting device 33 detects whether the reflection member 53 is at the horizontal position or not. When the reflection member 53 is tilted, an alarm is issued or leveling operation is performed.

Because the horizontality of the reflection member 53 is compensated, the laser beam emitted from the laser light source 98 is turned to a horizontal reference line, and a laser irradiation spot is formed at a light projecting point.

Further, by rotating the light source holder 96 adequately, it is possible to form the laser irradiation spot at any position as desired.

Figure 14:
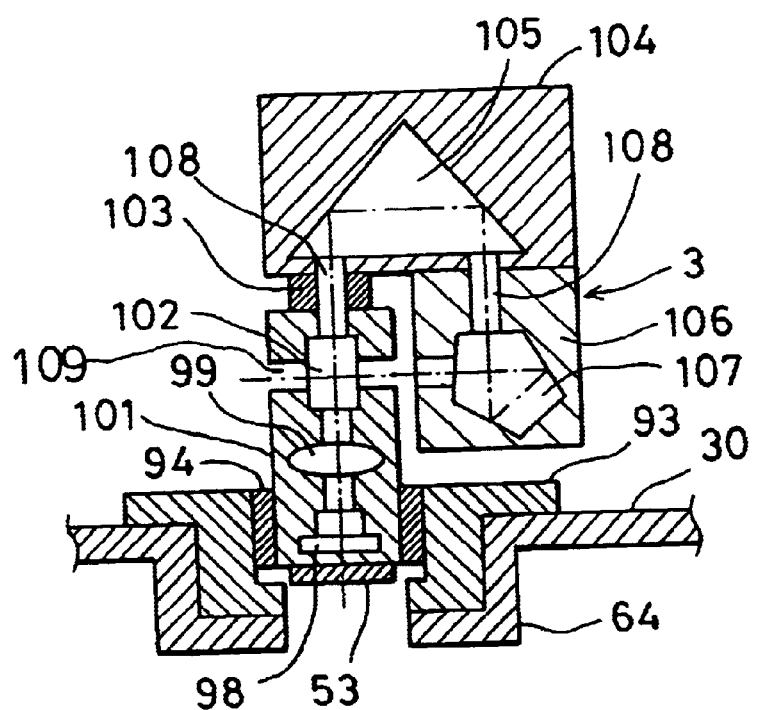
FIG. 14 is a cross-sectional view of a third variation of a laser beam irradiation unit in the above embodiment.

FIG. 14 shows a third variation of the laser beam irradiation unit.

In FIG. 14, the same component as shown in FIG. 13 is referred by the same symbol, and detailed description is not given here.

The engaging recess 64 is formed in the housing 30. The base 93 is engaged with the engaging recess 64, and a cylindrical light source holder 101 is rotatably mounted on the base 93 via the rotation bearings 94. The reflection member 53 is provided on a bottom surface of the light source holder 101. The reflection member 53 is positioned perpendicularly to the optical axis of the second light source 46 (see FIG. 1).

Inside the light source holder 101, there are provided the laser light source 98 such as a semiconductor laser and the condenser lens 99 so that an optical axis runs perpendicularly to the reflection member 53, and a cylindrical lens 102 is arranged so that the optical axis is aligned with the center line. The condenser lens 99 turns the laser beam from the laser light source 98 to the parallel beam. The end surface of the cylindrical lens 102 runs perpendicularly to the optical axis, and the laser beam runs through straightly in the lens 102.

A corner prism holder 104 is rotatably mounted on an upper end of the light source holder 101 via a hollow shaft 103, and a corner prism 105 is held in the corner prism holder 104. A pentagonal prism holder 106 is fixed on the lower surface of the corner prism holder 104, and a pentagonal prism 107 is held in the pentagonal prism holder 106. An optical path hole 108 is formed through the shaft 103, the corner prism holder 104, and the pentagonal prism holder 106 so that the laser beam which enters the corner prism 105 and the pentagonal prism holder 106 and is reflected can pass through the optical path hole.

The laser beam from the laser light source 98 is reflected so that the laser beam runs in parallel to the entered laser beam by the corner prism 105, and the laser beam is further deflected in a perpendicular direction (horizontal direction) by the pentagonal prism 107. Therefore, the laser beam from the laser light source 98 enters in a direction perpendicular to the central axis with respect to the cylindrical lens 102.

The light source holder 101 holds the cylindrical lens 102 opening a gap 109, and the reflected laser beam from the pentagonal prism 107 passes through the gap 109 and the cylindrical lens 102 and is projected in a horizontal direction so that the laser beam runs perpendicularly to the central axis of the cylindrical lens 102.

In the third variation of the laser beam irradiation unit 3, a spreading angle of the laser beam can be changed by the use of the cylindrical lens 102.

Now, description will be given referring to FIG. 15 and FIG. 16. FIG. 15 and FIG. 16 each shows the relationship between the laser beam and the cylindrical lens 102.

The laser beam passing through the cylindrical lens 102 has a deflection angle increased as it goes away from the center line of the cylindrical lens 102, and the projected light beam is turned to a fan-shaped laser beam spreading in a direction perpendicular to the center line of the cylindrical lens 102 (i.e. in the horizontal direction).

The laser beam 111 emitted from the semiconductor laser has a cross-section in a flat elliptical shape. Therefore, if it is supposed that a longer axis of the cross-section of the laser beam 111 is running in a direction perpendicular to the central axis of the cylindrical lens 102, the spreading angle of the laser beam 111 projected from the cylindrical lens 102 is increased (see FIG. 15).

If it is supposed that the longer axis of the cross-section of the laser beam 111 projected from the semiconductor laser runs in a direction consistent with the central axis of the cylindrical lens 102, the spreading angle of the laser beam 111 projected from the cylindrical lens 102 is decreased (see FIG. 16).

By rotating the corner prism holder 104 at an angle of 90° with respect to the light source holder 101, it is possible to change the spreading angle from the status shown FIG. 15 to the status shown in FIG. 16.

The case to select the larger spreading angle is the case where a reference line segment with a predetermined length is projected to a wall surface at a near distance. The luminance required is not so high, but a line segment of a certain length is required. The case to select the smaller spreading angle is the case where a reference line segment with a predetermined length is projected to a wall surface at a considerable distance, and high luminance is required.

The light source holder 101, i.e. the laser beam irradiation unit 3, can be rotated with respect to the housing 30 (main unit 2; see FIG. 1) via the rotation bearings 94. By rotating the light source holder 101, a reference line can be irradiated and formed at any position as desired.

When the rotation axis of the light source holder 101 is deviated, the pentagonal prism 107 is tilted both in a direction parallel to the paper surface and in a direction perpendicular to the paper surface in FIG. 14. In case that it is tilted in the perpendicular direction, the perpendicularity of the exit light optical axis with respect to the incident light optical axis of the laser beam can not be maintained according to the tilting direction. However, this error is very small, and there is no substantial problem.

The optical axis of the laser beam runs perpendicularly to the reflection member 53, and this makes it possible to detect poor accuracy caused by insertion and removal of the laser beam irradiation unit 3. Such a function may be provided that an alarm is issued if the poor accuracy exceeds the allowable value set in advance, alarm may be issued.

Figure 17:
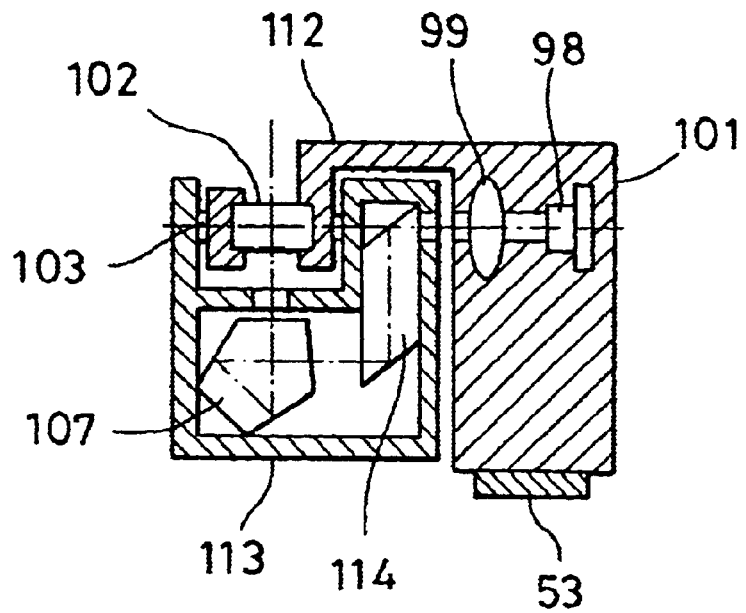
FIG. 17 is a cross-sectional view of a fourth variation of the laser beam irradiation unit in the above embodiment.

FIG. 17 shows a fourth variation of the laser beam irradiation unit 3.

The fourth variation of the laser beam irradiation unit 3 is an application of the third variation.

In the light source holder 101 removably mounted on the housing (not shown), the laser light source 98 having an optical axis in a horizontal direction is provided, and the condenser lens 99 is arranged on the optical axis.

From the light source holder 101, an arm 112 is extended in a horizontal direction, and the cylindrical lens 102 is held on the arm 112 in the horizontal direction. A prism holder 113 is provided on the arm 112 via the shaft 103 so that the prism holder 113 can be rotated at least at an angle of 90°. The center line of the shaft 103 is aligned with the center line of the cylindrical lens 102.

A rhombic prism 114 and the pentagonal prism 107 are held in the prism holder 113. The rhombic prism 114 moves an exit light optical axis with respect to an incident light optical axis of the laser beam from the laser light source 98 while maintaining the axes in parallel to each other, and this prism guides the laser beam toward the pentagonal prism 107. The pentagonal prism 107 deflects the incident light optical axis of the laser beam to a perpendicular direction and the laser beam is directed to enter the cylindrical lens 102. A fan-shaped laser beam spreading in a vertical direction is projected from the cylindrical lens 102.

In the fourth variation, the prism holder 113 is rotated at an angle of 90°, and the status of the laser beam entering the cylindrical lens 102 is changed from the status shown in FIG. 15 to the status shown in FIG. 16.

When the laser beam 111 enters the cylindrical lens 102 in a landscape direction with respect to the center line of the cylindrical lens 102 (see FIG. 15), the posture of the laser light source 98 is determined in such manner that the center of the optical axis of the fan-shaped laser beam is projected in the vertical direction. It is designed in such manner that the laser beam is projected in the horizontal direction when the prism holder 113 is rotated at an angle of 90° and the laser beam enters in a longitudinal direction with respect to the center line of the cylindrical lens 102 (see FIG. 16). Then, it is possible to provide a laser sighting device, which gives practical luminance distribution, i.e. with luminance not so high but larger spreading on a ceiling at a near distance and with high luminance but narrower spreading to an object at a longer distance in the horizontal direction.

In this variation, the tilting of the pentagonal prism also occurs due to deviation of the rotation shaft. If the accuracy of the rotation shaft is increased, only an error negligible occurs in the practical application.

Figure 18:
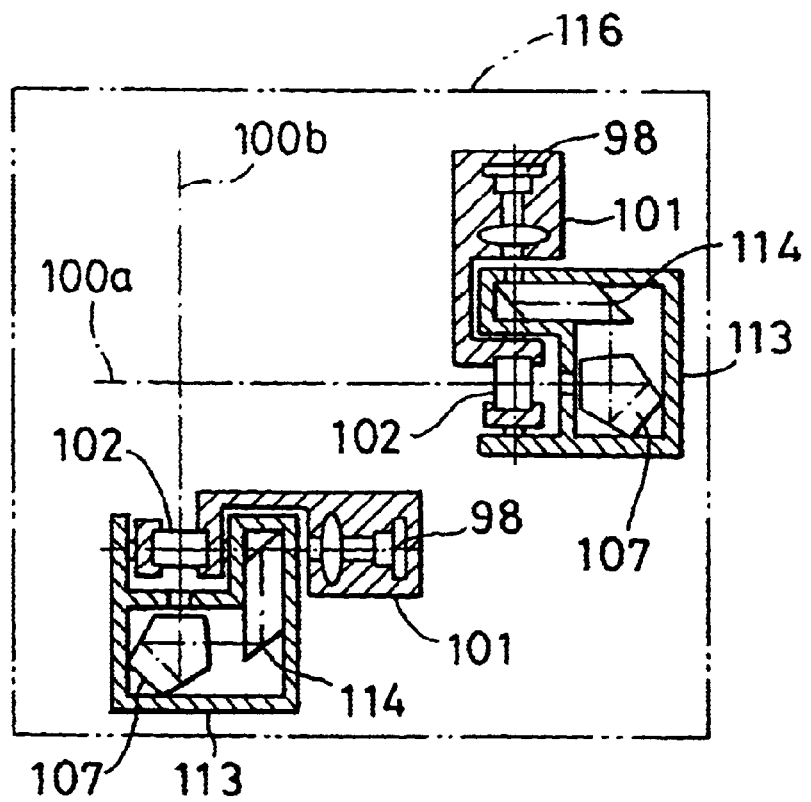
FIG. 18 is a plane cross-sectional view of a fifth variation of the laser beam irradiation unit in the above embodiment.

FIG. 18 shows a fifth variation of the laser beam irradiation unit 3.

In the fifth variation, two sets of the laser beam irradiation units 3 as shown in the variation of FIG. 17 are arranged so that the laser beams projected at an angle of 90° cross each other. A function as a vertical device is provided.

In FIG. 17, the reflection member 53 is placed on the light source holder 101. In FIG. 18, the reflection member 53 (not shown) is provided on a board 116, on which there are provided two laser light irradiation units 3. The two units are arranged in such manner that a plane including two optical axes of the laser light sources 98, 98 is in parallel to the reflection surface of the reflection member. Further, it is designed in such manner that the optical axes of two light sources 98 and 98 cross perpendicularly to each other.

With the arrangement as described above, the fan-shaped laser beams, being rotated and moved, cross on the optical axis, which cross perpendicularly to the reflection member, and a vertical point can be formed. Thus, it can provide the function as the vertical device.

In the variation as described above, a cylindrical lens is used as an optical member to spread the laser beam in a fan-like shape, while it is needless to say that a cylinder lens may be used.

Figure 19:
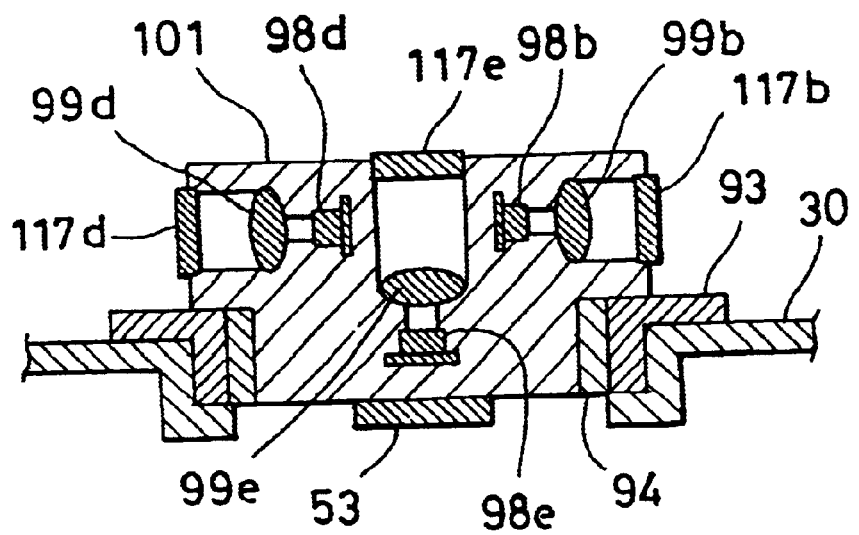
FIG. 19 is a cross-sectional view of a sixth variation of the laser beam irradiation unit in the above embodiment.
Figure 20:
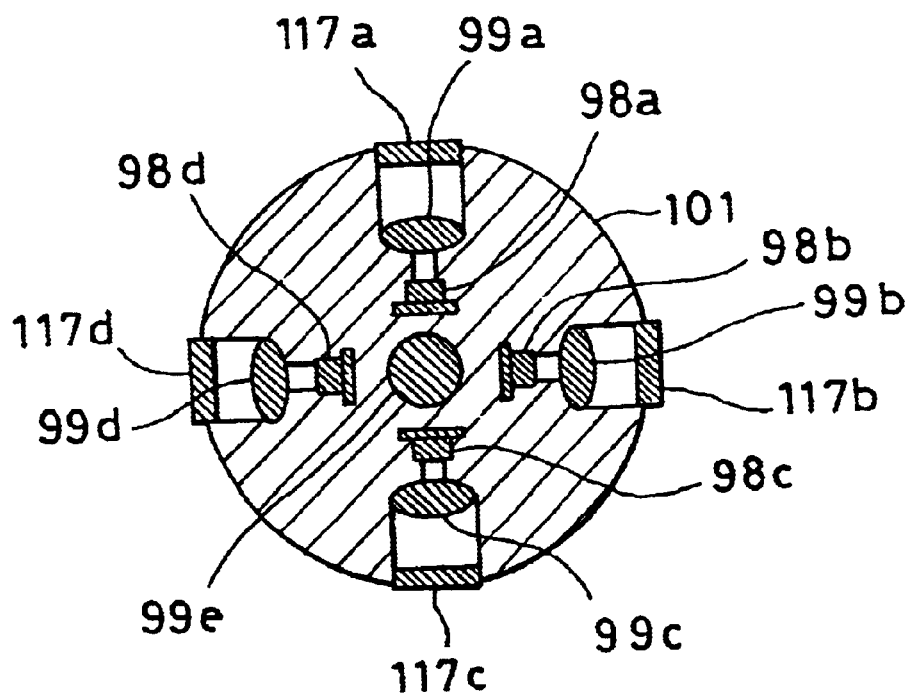
FIG. 20 is a plane cross-sectional view of the sixth variation of the laser beam irradiation unit of the present embodiment.

FIG. 19 and FIG. 20 each represents a sixth variation of the laser beam irradiation unit 3.

In this sixth variation, the laser beams are irradiated at the same time in a plurality of directions (in 4 horizontal directions crossing perpendicularly to each other, and in a vertical direction).

The base 93 is removably mounted on the housing 30, and the light source holder 101 is rotatably mounted on the base 93 via the rotation bearings 94. On the bottom surface of the light source holder 101, the reflection member 53 is provided so that it runs perpendicularly to the optical axis of the second light source 46 (see FIG. 1).

Laser light sources 98a, 98b, 98c and 98d positioned on a plane in parallel (horizontal) to the reflection member 53 and comprising optical axes in four directions crossing perpendicularly to each other are held in the light source holder 101. Laser beams emitted from the laser light sources 98a, 98b, 98c and 98d are turned to parallel beams by condenser lenses 99a99b, 99c and 99d and by condenser lenses 117a, 117b, 117c and 117d and are projected in the horizontal directions. A laser light source 98e having an optical axis in the vertical direction is positioned at the center of the light source holder 101, and condenser lenses 99e and 117e are arranged on the optical axis of the laser light source 98e. The laser beam emitted from the laser light source 98e is turned to the parallel beam by the condenser lenses 99e and 117e and are projected in the vertical direction.

By rotating the light source holder 101, it is possible to move a position to form a laser irradiation spot.

Thus, reference spot light beams are formed in 5 directions, i.e. in 4 horizontal directions and in the vertical direction.

Figure 21:
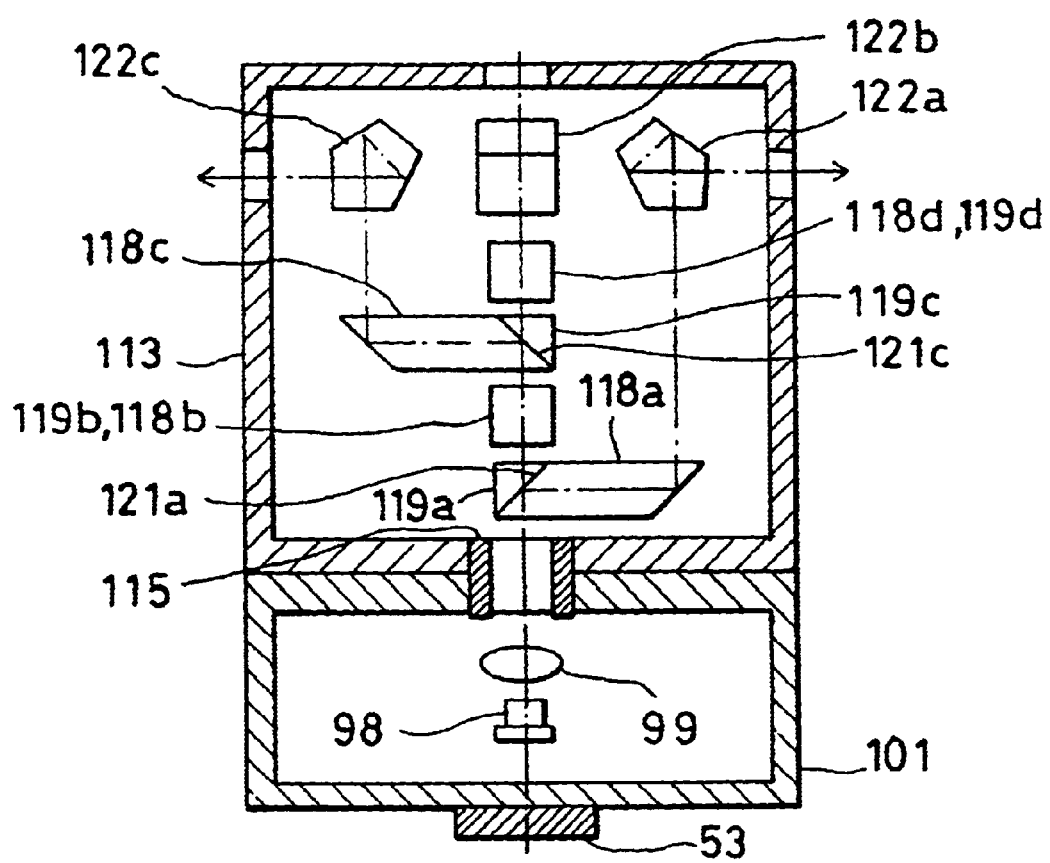
FIG. 21 is a cross-sectional view of a seventh variation of the laser irradiation unit in the present embodiment.
Figure 22:
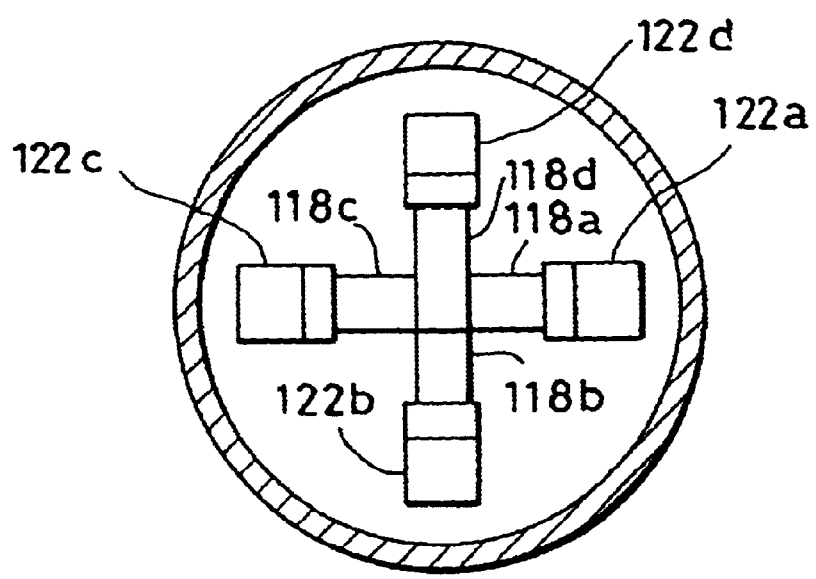
FIG. 22 is a plane cross-sectional view of the seventh variation of the laser beam irradiation unit of the present embodiment.

Referring to FIG. 21 and FIG. 22, description will be given below on a seventh variation of the laser beam irradiation unit 3.

The light source holder 101 is removably mounted on the housing 30 (not shown), and the prism holder 113 is rotatably mounted on the light source holder 101 via a hollow rotation shaft 115.

In the seventh variation, the laser beam coming from the single laser light source 98 is split in 4 horizontal directions and in a vertical direction and are projected.

On the light source holder 101, the laser light source 98 having an optical axis perpendicular to the reflection member 53 is arranged, and the condenser lens 99 is disposed on the optical axis of the laser light source 98. The condenser lens 99 turns the laser beam emitted from the laser light source 98 to a parallel beam and a diffusion beam.

In the prism holder 113, rhombic prisms 118a, 118b, 118c and 118d are disposed at horizontal positions in four stages and arranged in four directions so that optical axes of these prisms cross perpendicularly to each other. Each of right-angle prisms 119a119b, 119c and 119d is fixed to an end closer to the center of each of the rhombic prisms 118a, 118b, 118c and 118d respectively. Boundary surfaces where prisms are fixed together are designed as half-mirror surfaces 121a, 121b (not shown), 121c and 121d (not shown), respectively. The end closer to the center of each of the rhombic prisms 118a, 118b, 118c and 118d serves as a beam splitter.

The half-mirror surface 121a has a transmitting surface which has such characteristics that the surface passes ⅘ of the light beam and reflects ⅕ of the laser beam. The half-mirror surface 121*b* has a transmitting surface which has such characteristics that the surface passes ¾ of the light beam and reflects ¼ of the laser beam. The half-mirror surface 121*c* has a transmitting surface which has such characteristics that the surface passes ⅔ of the light beam and reflects ⅓ of the laser beam. The half-mirror surface 121*d* has a transmitting surface which has such characteristics that the surface passes ½ of the light beam and reflects ½ of the laser beam. It is designed that a light amount of each split laser beam is equal to each other.

The laser beam split in a horizontal direction at the end closer to the center of each of the rhombic prisms 118*a*, 118*b*, 118*c* and 118*d* is reflected in a direction parallel to the optical axis of the laser light source 98 (perpendicularly to the reflection member 53) by an outer end of each of the rhombic prism 118*a*, 118*b*, 118*c*, and 118*d*. Pentagonal prisms 122*a*, 122*b*, 122*c* and 122*d* are arranged on reflection light optical axes of the rhombic prisms 118*a*, 118*b*, 118*c* and 118*d* respectively. The pentagonal prisms 122*a*, 122*b*, 122*c* and 122*d* are positioned on the same plane, which crosses perpendicularly to the optical axis of the laser light source 98, and these pentagonal prisms deflect the laser beams reflected by the rhombic prisms 118*a*, 118*b*, 118*c* and 118*d* in horizontal direction and project these beams in the horizontal direction. After passing through the rhombic prism 118*d* at the uppermost stage, the laser beam is projected in the vertical direction.

If adjustment is made by the tilt detection device 33 so that the reflection member 53 is held in the horizontal position (see FIG. 1), the laser beams are projected in 4 directions crossing perpendicularly to each other on the horizontal plane and in the vertical direction. When the irradiating position in 4 horizontal directions is changed, the prism holder 113 should be rotated as appropriate.

Figure 23:
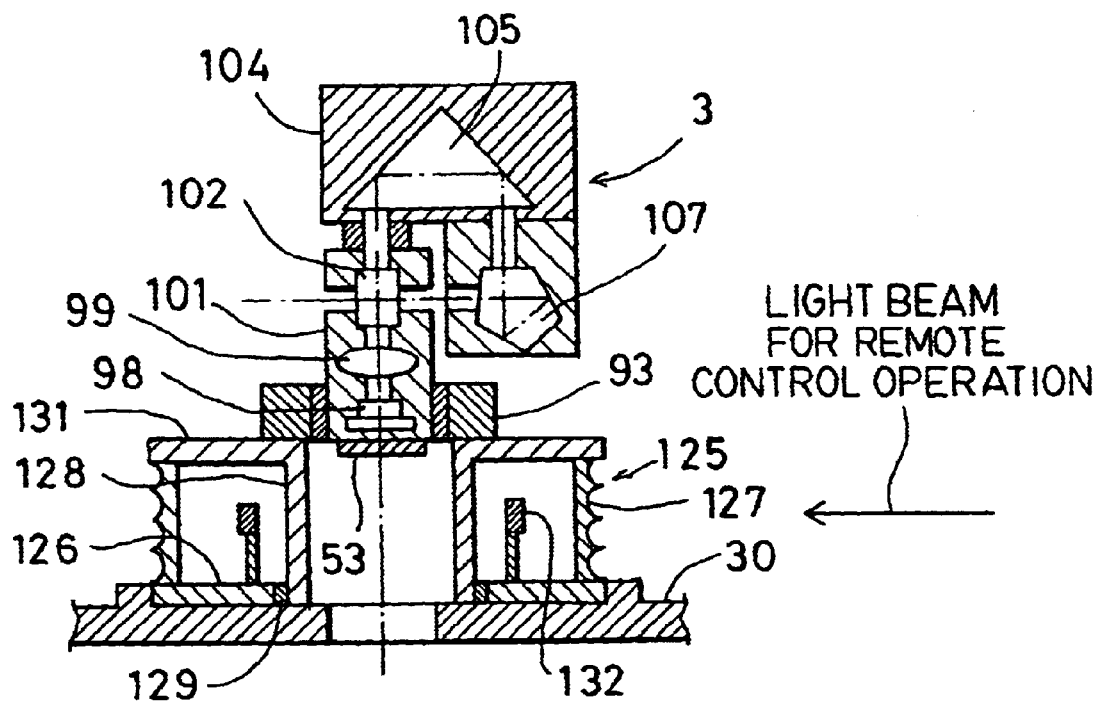
FIG. 23 is a cross-sectional view of a photodetection unit of the laser sighting device.
Figure 24:
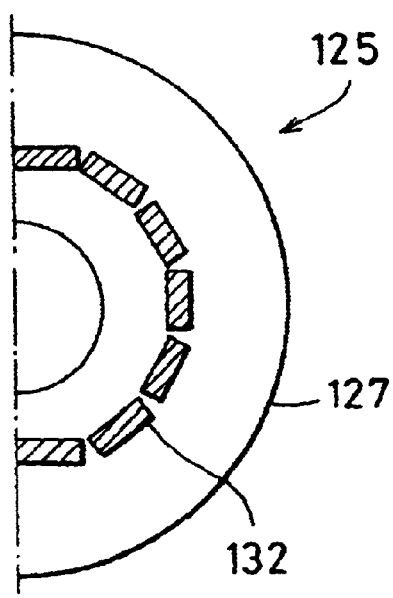
FIG. 24 is a partial plane cross-sectional view of the photodetection unit.

FIG. 23 and FIG. 24 each represents a laser sighting device provided with a photodetection unit 125 when the laser sighting device can be remotely controlled by optical communication.

An optical communication transmitter (not shown) is held at a position away from the main unit 2 by an operator, etc., and this is used when the operating condition of the laser sighting device is to be changed. The operating condition of the laser sighting device is changed in such case that a width of the fan-shaped laser beam is to be changed or in such case that the irradiating direction or the irradiating position of the laser beam is to be changed.

The optical communication transmitter modulates the laser beam emitted from a light emitting element such as LED (not shown). In the modulated oscillating condition, the information is superimposed on the laser beam and is transmitted.

The photodetection unit 125 is mounted on the upper surface of the housing 30. The photodetection unit 125 is designed in form of a doughnut as a whole, and a hollow portion at the center serves as an optical path of the laser beam from the second light source 46. The laser beam irradiation unit 3 is mounted on the upper surface of the photodetection unit 125 via the base 93. The laser beam irradiation unit 3 is the same as explained in FIG. 14, and detailed description on the laser beam irradiation unit 3 is not given here.

A fixed plate 126 is fixed on the housing 30 by socket and spigot joint method, and a cylindrical lens 127 is mounted concentrically on the fixed plate 126. A hollow shaft 128 is rotatably mounted on the fixed plate 126 via bearings 129, and a rotary table 131 is fixed on the hollow shaft 128.

Photodetection elements 132, e.g. photodiodes, are arranged on the same circumference and over total circumference on the fixed plate 126.

The cylindrical lens 127 receives a transmission light from the optical communication transmitter (not shown) regardless of the direction, and the light receiving field is spread in the vertical direction. The cylindrical lens 127 is designed in such manner that its cross-section consists of cylinder lenses connected each other in the axial direction, and the same cross-sectional shape are found over the total circumference. Because the cross-section is in form of cylinder lenses, a light detection range is spread in the vertical direction. The cylindrical lens 127 may be arranged on either on the fixed plate 126 or on the rotary table 131. The photodetection unit 125 can receive the transmission light from any angle over the total circumference, i.e., over an angle of 360°.

As described above, the photodetection elements 132 are arranged with equal spacing over the total circumference. By detecting which of the photodetection elements 132 receives the transmission light from the optical communication transmitter (not shown), the direction toward the position of the optical communication transmitter can be detected.

The rotary table 131 is rotatably mounted on the fixed plate 126 and the rotary table 131 can be driven by a motor and a gear (not shown). The rotary table 131 of the photodetection unit 125 is designed in such manner that the position in the rotating direction with respect to the fixed plate 126 can be detected by means such as an encoder (not shown). As in the same manner, an encoder (not shown) is also provided between the rotary table 131 and the light source holder 101 and/or the corner prism holder 104. The laser beam irradiation unit 3 can detect positional relationship of three rotating directions of the rotary table 131, the light source holder 101, and the corner prism holder 104.

Positioning means such as projection and recess is provided for the rotary table 131 of the photodetection unit 125 and for the base 93 of the laser beam irradiation unit 3.

Therefore, the direction of the optical communication transmitter can be detected by the photodetection elements 132, and the fan-shaped laser beam can be directed in the detected direction. Also, it is possible to change spreading width of the fan-shaped laser beam at any position as required.

To mount or remove the photodetection unit 125 to or from the main unit 2 or the laser beam irradiation unit 3, various means are used such as a magnet, a screw stop, or screwing.

Figure 25:
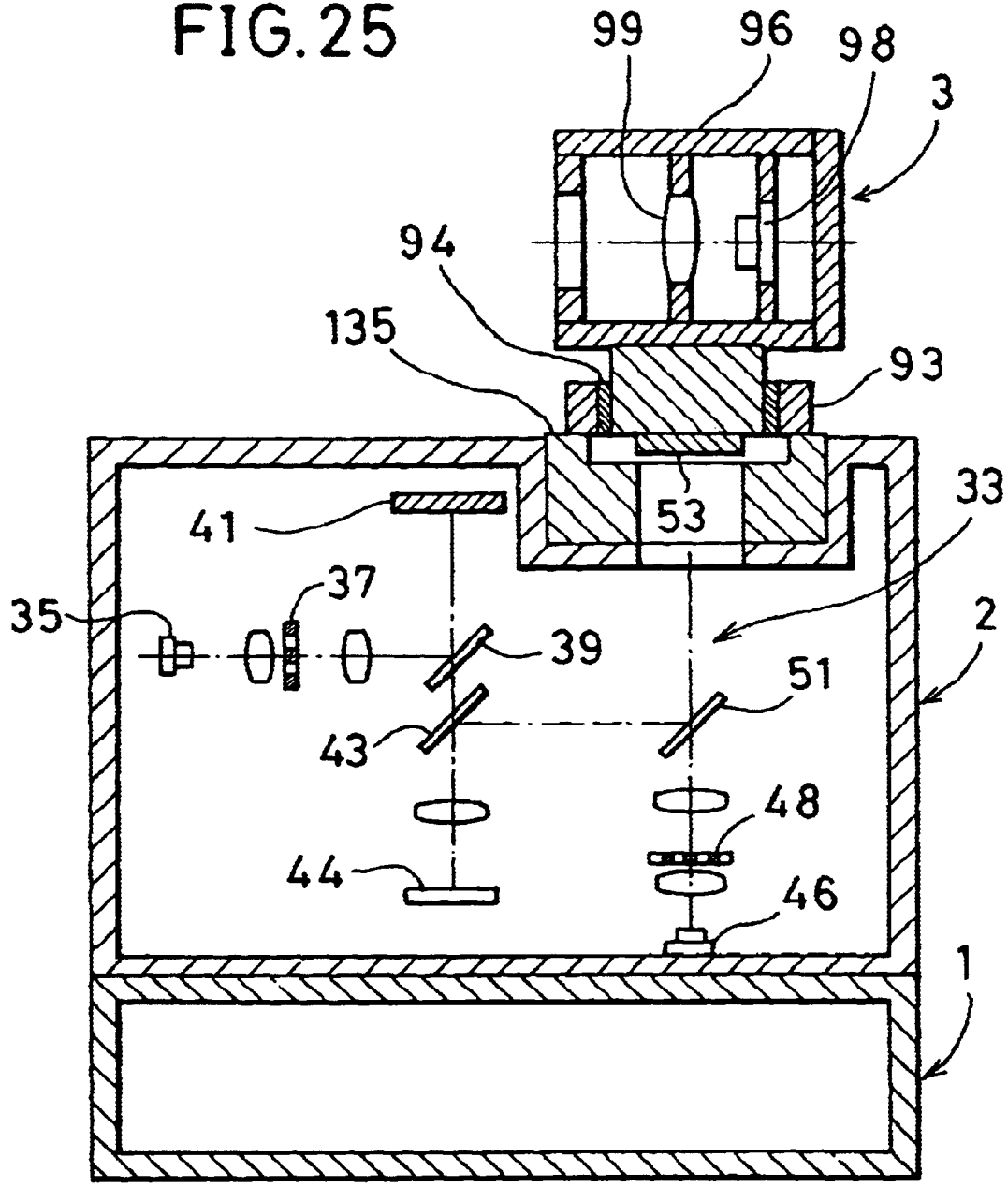
FIG. 25 shows another embodiment of the present invention and is a cross-sectional view of a laser sighting device comprising a coarse leveling unit and a fine leveling unit.

A variation shown in FIG. 25 has the leveling unit 1 as a coarse leveling unit, and it is also provided with a fine leveling unit 135. The laser beam irradiation unit 3 as shown in FIG. 13 is incorporated in the leveling unit 1 and the main unit 2 as shown in FIG. 1, and the laser beam irradiation unit 3 is mounted via the fine leveling unit 135. In FIG. 25, the same component as shown in FIG. 1 or FIG. 13 is referred by the same symbol, and detailed description is not given here on the leveling unit 1, the main unit 2, and the laser beam irradiation unit 3 because the same description has been given on them.

In the variation as described above, the leveling unit 1 is driven by detecting deviation between tilting of the reflection member 53 and tilting of the free liquid surface of the liquid member 41, while another fine leveling unit 35 may be provided on the laser beam irradiation unit 3 as shown in FIG. 25 to improve the stability of tilt detection.

In the variation as described above, in case where the laser beam irradiation unit 3 is rotatable, and if rotation axis is not aligned with the vertical line when the rotating unit is moved, leveling operation must be performed each time. This may apply to almost all cases because the rotation axis is not directed in the vertical direction in normal operation.

The free liquid surface in the liquid member 41 is used as a reference for tilt detection. If the liquid member 41 is moving during leveling operation, time is required until stability is reached.

In the present variation, deviation between the reflection member 53 and the free liquid surface of the liquid member 41 is detected. For rough leveling, coarse leveling is performed by the leveling unit 1, and, for the rest of the leveling, fine leveling is performed by the fine leveling unit 135 until the reflection member 53 is turned to parallel to the free liquid surface of the liquid member 41.

The above structure is suitable to perform coarse leveling and fine leveling respectively, and the time required for leveling can be reduced. Further, only fine leveling may be performed in case the rotating part of the laser beam irradiation unit 3 is rotated, and this prevents unnecessary vibration or movement of the tilt detecting device 33, i.e. the liquid member 41.

Stable leveling operation can be ensured during the process such as the change of the projecting the direction of the laser beam.

According to the present invention, the laser beam irradiation unit for irradiating the laser beam is removably mounted on the main unit. Further, the horizontal and vertical directions of the irradiated laser beam can be accurately compensated by the tilt detecting device. As a result, this can cope with any type of use such as formation of a reference spot light beam, formation of a reference plane, etc. General versatility of the laser sighting device can be increased while maintaining high accuracy of the device. The reference spot light beam or the reference plane can be formed on a plurality of planes at the same time, or the fan-shaped laser beam can be irradiated. Further, spreading angle can be changed, and luminance suitable for the near distance or the long distance can be obtained. Because coarse leveling and fine leveling can be carried out independently, leveling operation can be simplified. Tilting of the laser beam irradiation unit removably mounted can be directly detected, and this contributes to the improvement of the accuracy of the reference point and the reference plane.

What is claimed is:

1. A laser sighting device, comprising a main unit, a leveling unit for adjusting the tilting of said main unit, and a laser beam irradiation unit removably mounted on said main unit, wherein a fixed reflection member is mounted on said laser beam irradiation unit, and said main unit has a tilt detecting device for projecting a light beam toward said fixed reflection member and for detecting angular deviation between said main unit and said fixed reflection member based on a reflection light beam from said fixed reflection member, and wherein said leveling unit is controlled based on detection of said tilt detecting device, and tilting of a laser beam from said laser beam irradiation unit is compensated.

2. A laser sighting device according to claim 1, wherein there is provided a display unit on said main unit, sand said display unit displays the angular deviation detected by said tilt detecting device and/or an alarm that the angular deviation exceeds an allowable value.

3. A laser sighting device according to claim 1, wherein there are provided a coarse leveling unit for leveling of said main unit and a fine leveling unit for leveling said laser beam irradiation unit independently from said main unit, and wherein coarse leveling is performed by said coarse leveling unit and whereupon fine leveling is performed by said fine leveling unit.

4. A laser sighting device according to claim 1, wherein said tilt detecting device comprises a photodetection element, a liquid member for forming a free liquid surface, a free liquid light projecting system for projecting a light beam toward said liquid member, a fixed reflection member light projecting system for projecting a light beam to said fixed reflection member, a photodetection optical system for guiding a reflection light beam from said free liquid surface of said liquid member and a reflection light from said fixed reflection member toward said photodetection element, and an arithmetic processing unit for calculating tilting of said main unit from deviation of two reflection images received by said photodetection element.

5. A laser sighting device according to claim 4, wherein said free liquid surface light projecting system and said fixed reflection member light projecting system comprise a common light source to and a beam splitter for splitting the light beam from said light source to a light beam to be directed toward said liquid member and to a light beam directed toward said fixed reflection member.

6. A laser sighting device according to claim 5, wherein there is provided a pattern arranged in such manner that the light beam from said common light source can pass through, and said pattern further comprises a pattern where the light beam to said liquid member can pass through and a pattern where the light beam to said fixed reflection member can pass through.

7. A laser sighting device according to claim 1, wherein said laser beam irradiation unit comprises a laser light source for emitting a laser beam and said laser beam irradiation unit is removable from said main unit.

8. A laser sighting device according to claim 1, wherein said removable laser beam irradiation unit comprises a laser beam splitting means for splitting the laser beam into a transmission light and into a reflection light, wherein the laser beam is irradiated by being split in four horizontal directions and in a vertical direction.

9. A laser sighting device according to claim 1, wherein said laser beam irradiation unit irradiates the laser beam through a cylinder lens.

10. A laser sighting device according to claim 9, wherein a cross-sectional direction of the laser beam entering the cylindrical lens can be changed, and a spreading angle of a fan-shaped laser beam can be changed.

11. A laser sighting device according to claim 1, wherein said laser beam irradiation unit irradiated two fan-shaped laser beams, and said two fan-shaped laser beams are irradiated crossing each other.

12. A laser sighting device according to claim 1, wherein said removable type laser beam irradiation unit is provided with a photodetection unit capable of receiving a light beam for remote control operation.

* * * * *